US010999885B1

(12) United States Patent
Shih et al.

(10) Patent No.: US 10,999,885 B1
(45) Date of Patent: May 4, 2021

(54) METHOD AND APPARATUS FOR RELEASING PRECONFIGURED UPLINK RESOURCES (PUR) IN A WIRELESS COMMUNICATION SYSTEM

(71) Applicant: ASUSTek Computer Inc., Taipei (TW)

(72) Inventors: Tun-Huai Shih, Taipei (TW);
Yu-Hsuan Guo, Taipei (TW);
Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/071,183

(22) Filed: Oct. 15, 2020

Related U.S. Application Data

(60) Provisional application No. 62/931,000, filed on Nov. 5, 2019, provisional application No. 62/929,294, filed on Nov. 1, 2019.

(51) Int. Cl.
*H04W 76/19* (2018.01)
*H04W 74/08* (2009.01)
*H04W 76/30* (2018.01)
*H04W 76/27* (2018.01)

(52) U.S. Cl.
CPC ....... *H04W 76/19* (2018.02); *H04W 74/0833* (2013.01); *H04W 76/27* (2018.02); *H04W 76/30* (2018.02)

(58) Field of Classification Search
CPC . H04W 76/19; H04W 74/0833; H04W 76/30; H04W 76/27
See application file for complete search history.

(56) References Cited

U.S. PATENT DOCUMENTS

2014/0148169 A1* 5/2014 Li ............... H04W 36/0061
455/437
2020/0351844 A1* 11/2020 Rico Alvarino ...... H04W 72/14

FOREIGN PATENT DOCUMENTS

CN 102223658 A 10/2011
CN 110958103 A 4/2020
WO WO-2020165148 A1 * 8/2020 ............ H04W 76/27

* cited by examiner

*Primary Examiner* — Will W Lin
(74) *Attorney, Agent, or Firm* — Cooper Legal Group, LLC

(57) ABSTRACT

A method and apparatus are disclosed. In an example from the perspective of a User Equipment (UE), the UE keeps a dedicated Preconfigured Uplink Resources (PUR) configuration when the UE is in Radio Resource Control (RRC) idle state and a serving cell of the UE is a second cell, wherein the UE is configured with the dedicated PUR configuration in a first cell different than the second cell. The UE selects a third cell during a RRC connection re-establishment procedure. In response to the selecting the third cell, the UE determines whether or not to release the dedicated PUR configuration based upon whether or not the third cell is the same as the first cell, wherein the determining whether or not to release the dedicated PUR configuration is performed when the UE is in RRC connected state.

20 Claims, 11 Drawing Sheets

US 10,999,885 B1

METHOD AND APPARATUS FOR RELEASING PRECONFIGURED UPLINK RESOURCES (PUR) IN A WIRELESS COMMUNICATION SYSTEM

CROSS-REFERENCE TO RELATED APPLICATIONS

The present Application claims the benefit of U.S. Provisional Patent Application Ser. No. 62/929,294 filed on Nov. 1, 2019, the entire disclosure of which is incorporated herein in its entirety by reference. The present Application also claims the benefit of U.S. Provisional Patent Application Ser. No. 62/931,000 filed on Nov. 5, 2019, the entire disclosure of which is incorporated herein in its entirety by reference.

FIELD

This disclosure generally relates to wireless communication networks, and more particularly, to a method and apparatus for releasing preconfigured uplink resources (PUR) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE keeps a dedicated Preconfigured Uplink Resources (PUR) configuration when the UE is in Radio Resource Control (RRC) idle state and a serving cell of the UE is a second cell, wherein the UE is configured with the dedicated PUR configuration in a first cell different than the second cell. The UE selects a third cell during a RRC connection re-establishment procedure. In response to the selecting the third cell, the UE determines whether or not to release the dedicated PUR configuration based upon whether or not the third cell is the same as the first cell, wherein the determining whether or not to release the dedicated PUR configuration is performed when the UE is in RRC connected state.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.300 V15.7.0, "E-UTRA and E-UTRAN, Overall description, Stage 2"; 3GPP TS 36.331 V15.7.0, "E-UTRA, RRC protocol specification"; 3GPP RAN1 #96 Chairman's Note; 3GPP RAN1 #96bis Chairman's Note; 3GPP RAN1 #98 Chairman's Note; 3GPP RAN1 #98bis Chairman's Note; R2-1914102, "RAN2 agreements for Rel-16 additional enhancements for NB-IoT and MTC". The standards and documents listed above are hereby expressly incorporated by reference in their entirety.

Figure 1:
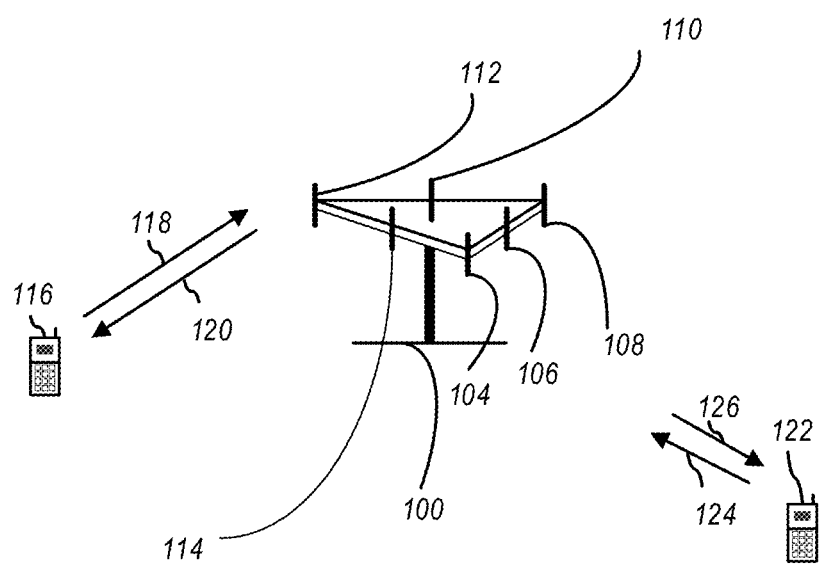
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
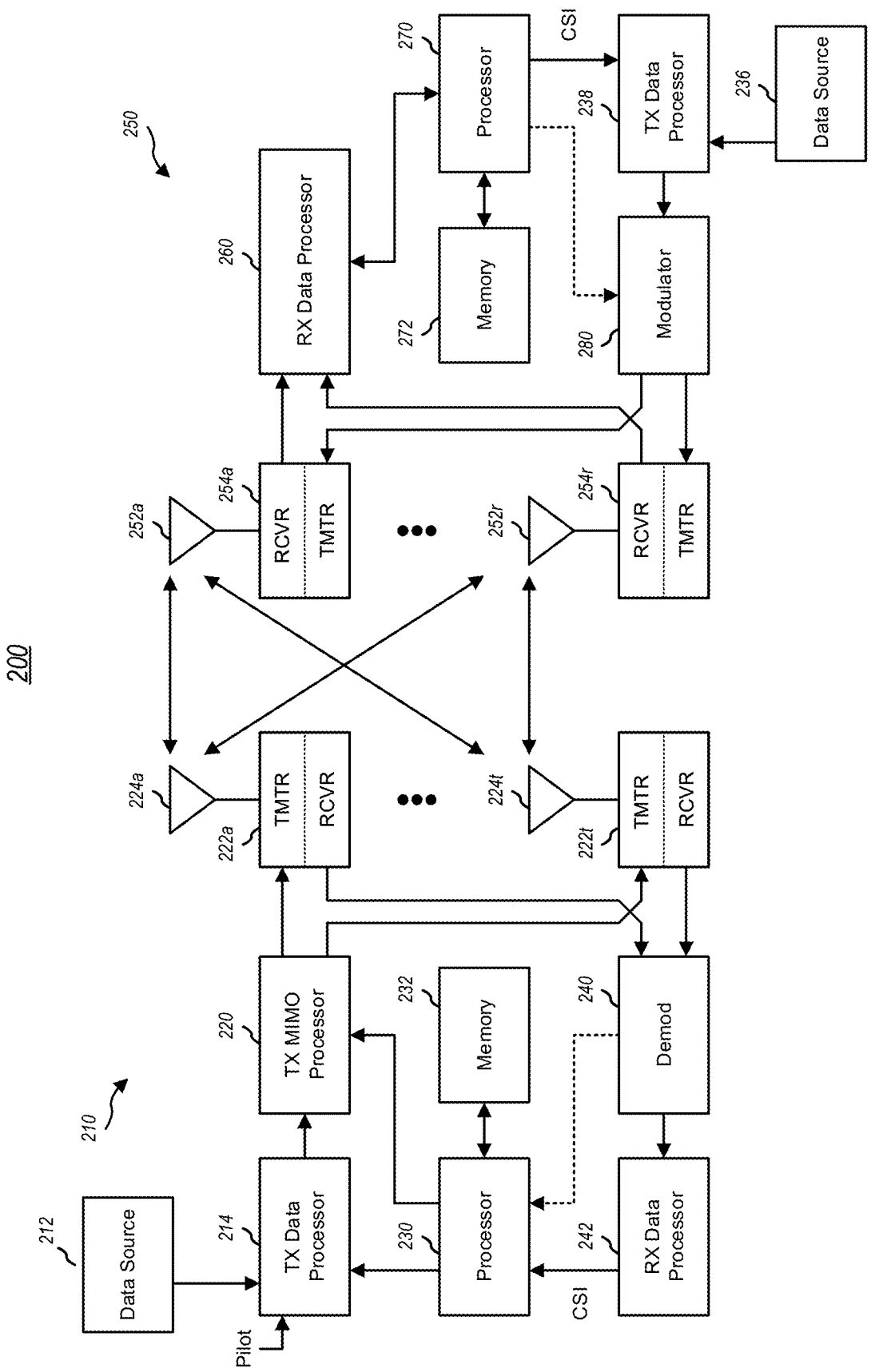
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
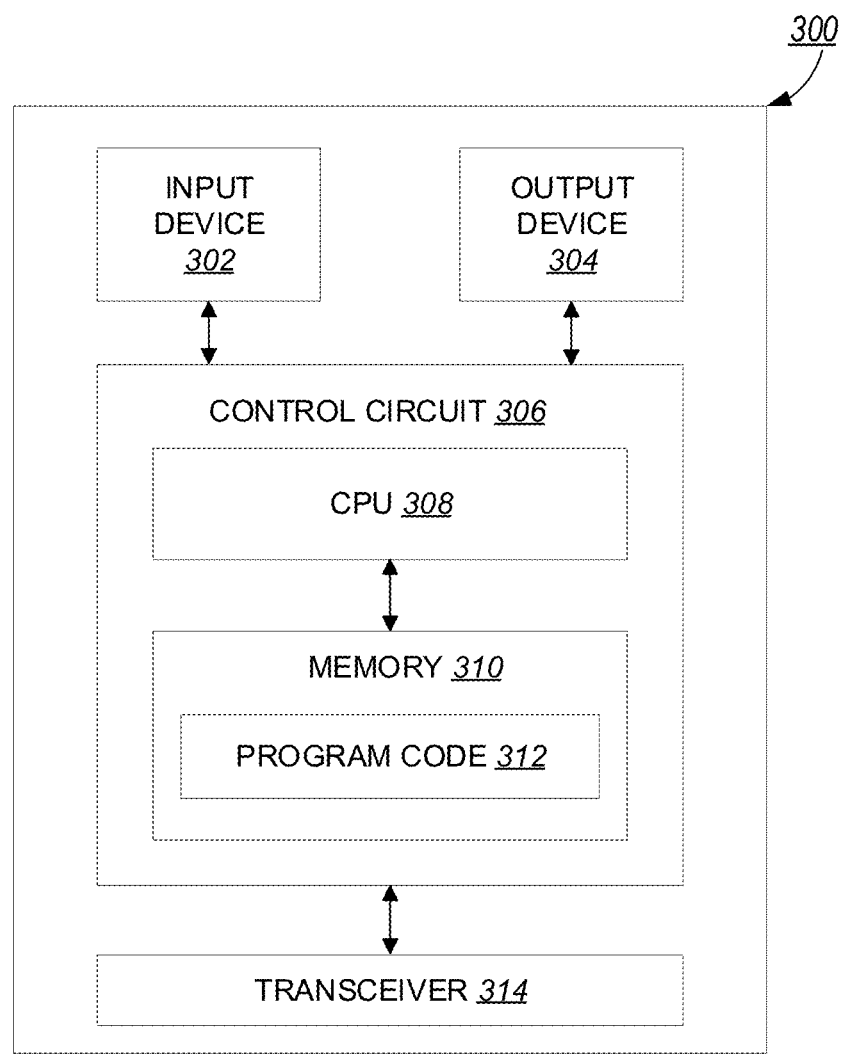
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
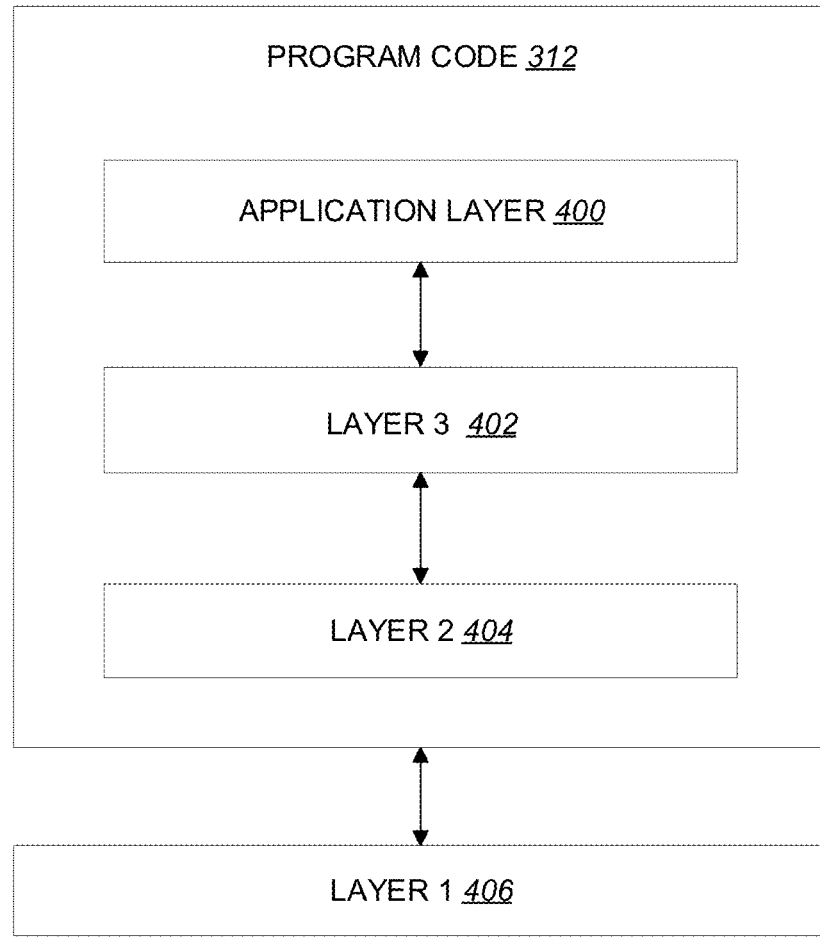
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Figure 6:
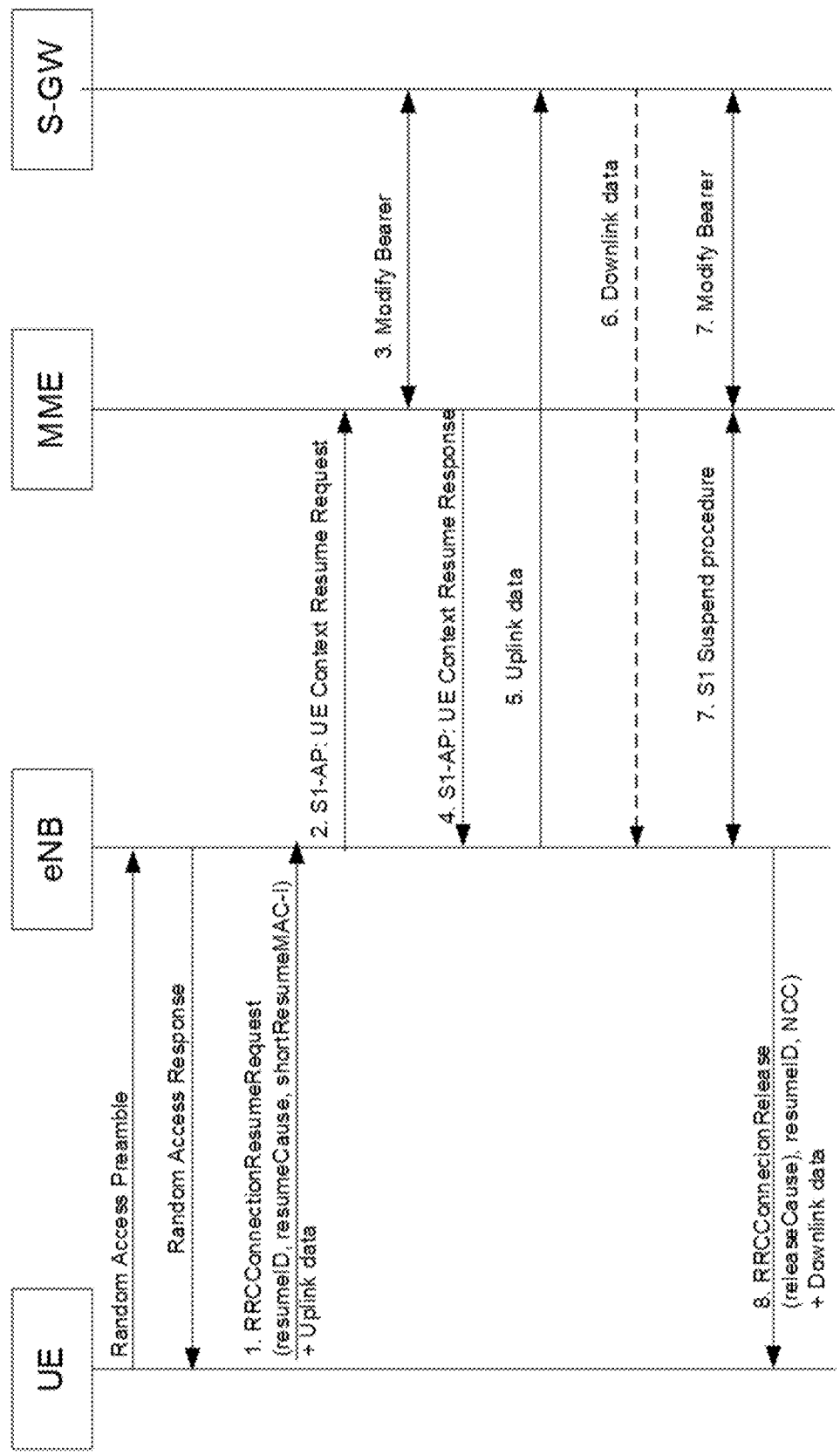
FIG. 6 is a diagram illustrating an exemplary scenario associated with EDT for User Plane CIoT EPS optimizations according to one exemplary embodiment.
Figure 7:
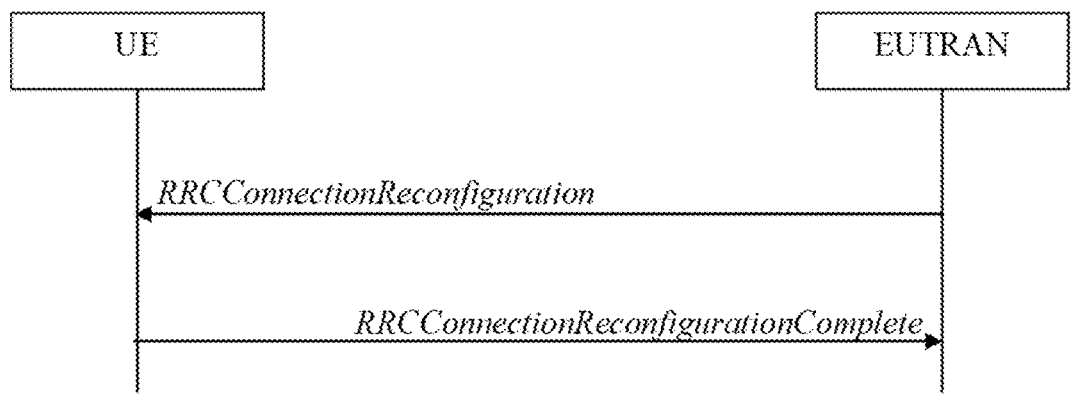
FIG. 7 is a diagram illustrating an exemplary scenario associated with RRC connection reconfiguration according to one exemplary embodiment.

Description related to Early Data Transmission (EDT) in LTE is provided in 3GPP TS 36.300 V15.7.0. Notably, Figure 7.3b-1 of Section 7.3b.2 of 3GPP TS 36.300 V15.7.0, entitled "EDT for Control Plane CIoT EPS Optimizations", is reproduced herein as FIG. 5. Figure 7.3b-2 of Section 7.3b.3 of 3GPP TS 36.300 V15.7.0, entitled "EDT for User Plane CIoT EPS Optimizations", is reproduced herein as FIG. 6. Parts of 3GPP TS 36.300 V15.7.0 are quoted below:

7.3 Transport of NAS Messages

The AS provides reliable in-sequence delivery of NAS messages in a cell. During handover, message loss or duplication of NAS messages can occur.

In E-UTRAN, NAS messages are either concatenated with RRC messages or carried in RRC without concatenation. Upon arrival of concurrent NAS messages for the same UE requiring both concatenation with RRC for the high priority queue and also without concatenation for the lower priority queue, the messages are first queued as necessary to maintain in-sequence delivery.

In downlink, when an EPS bearer (EPC) or PDU Session (5GC) establishment or release procedure is triggered, or for EDT in case of Control Plane CIoT EPS optimization, the NAS message should normally be concatenated with the associated RRC message. When the EPS bearer (EPC) or PDU Session (5GC) is modified and when the modification also depends on a modification of the radio bearer, the NAS message and associated RRC message should normally be concatenated. Concatenation of DL NAS with RRC message is not allowed otherwise. In uplink, concatenation of NAS messages with RRC message is used only for transferring the initial NAS message during connection setup and for EDT in case of Control Plane CIoT EPS optimization. Initial Direct Transfer is not used in E-UTRAN and no NAS message is concatenated with RRC connection request.

Multiple NAS messages can be sent in a single downlink RRC message during EPS bearer (EPC) or PDU Session (5GC) establishment or modification. In this case, the order of the NAS messages in the RRC message shall be kept the same as that in the corresponding S1-AP (EPC) or NG-AP (5GC) message in order to ensure the in-sequence delivery of NAS messages.

NOTE: NAS messages are integrity protected and ciphered by PDCP, in addition to the integrity protection and ciphering performed by NAS.

7.3b EDT 7.3b.1 General

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

7.3b.2 EDT for Control Plane CIoT EPS Optimizations

EDT for Control Plane CIoT EPS optimizations, as defined in TS 24.301 [20], is characterized as below:

Uplink user data are transmitted in a NAS message concatenated in UL RRCEarlyDataRequest message on CCCH;

Downlink user data are optionally transmitted in a NAS message concatenated in DL RRCEarlyDataComplete message on CCCH;

There is no transition to RRC CONNECTED.

The EDT procedure for Control Plane CIoT EPS optimizations is illustrated in Figure 7.3b-1.

Figure 7.3b-1: EDT for Control Plane CIoT EPS Optimizations

0. Upon connection establishment request for Mobile Originated data from the upper layers, the UE initiates the early data transmission procedure and selects a random access preamble configured for EDT.
1. UE sends RRCEarlyDataRequest message concatenating the user data on CCCH.
2. The eNB initiates the S1-AP Initial UE message procedure to forward the NAS message and establish the S1 connection. The eNB may indicate in this procedure that this connection is triggered for EDT.
3. The MME requests the S-GW to re-activate the EPS bearers for the UE.
4. The MME sends the uplink data to the S-GW.
5. If downlink data are available, the S-GW sends the downlink data to the MME.
6. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.
7. If no further data are expected, the eNB can send the RRCEarlyDataComplete message on CCCH to keep the UE in RRC_IDLE. If downlink data were received in step 6, they are concatenated in RRCEarlyDataComplete message.
8. The S1 connection is released and the EPS bearers are deactivated.

NOTE 1: If the MME or the eNB decides to move the UE in RRC_CONNECTED mode, RRCConnectionSetup message is sent in step 7 to fall back to the legacy RRC Connection establishment procedure; the eNB will discard the zero-length NAS PDU received in RRCConnectionSetupComplete message.

NOTE 2: If neither RRCEarlyDataComplete nor, in case of fallback, RRCConnectionSetup is received in response to RRCEarlyDataRequest, the UE considers the UL data transmission not successful.

7.3b.3 EDT for User Plane CIoT EPS Optimizations

EDT for User Plane CIoT EPS optimizations, as defined in TS 24.301 [20], is characterized as below:

The UE has been provided with a NextHopChainingCount in the RRCConnectionRelease message with suspend indication;

Uplink user data are transmitted on DTCH multiplexed with UL RRCConnectionResumeRequest message on CCCH;

Downlink user data are optionally transmitted on DTCH multiplexed with DL RRCConnectionRelease message on DCCH;

The short resume MAC-I is reused as the authentication token for RRCConnectionResumeRequest message and is calculated using the integrity key from the previous connection;

The user data in uplink and downlink are ciphered. The keys are derived using the NextHopChainingCount provided in the RRCConnectionRelease message of the previous RRC connection;

The RRCConnectionRelease message is integrity protected and ciphered using the newly derived keys;

There is no transition to RRC CONNECTED.

The EDT procedure for User Plane CIoT EPS optimizations is illustrated in Figure 7.3b-2.

Figure 7.3b-2: EDT for User Plane CIoT EPS Optimizations

0. Upon connection resumption request for Mobile Originated data from the upper layers, the UE initiates the early data transmission procedure and selects a random access preamble configured for EDT.
1. The UE sends an RRCConnectionResumeRequest to the eNB, including its Resume ID, the establishment cause, and an authentication token. The UE resumes all SRBs and DRBs, derives new security keys using the NextHopChainingCount provided in the RRCConnectionRelease message of the previous connection and re-establishes the AS security. The user data are ciphered and transmitted on DTCH multiplexed with the RRCConnectionResumeRequest message on CCCH.
2. The eNB initiates the S1-AP Context Resume procedure to resume the S1 connection and re-activate the S1-U bearers.
3. The MME requests the S-GW to re-activate the S1-U bearers for the UE.
4. The MME confirms the UE context resumption to the eNB.
5. The uplink data are delivered to the S-GW.
6. If downlink data are available, the S-GW sends the downlink data to the eNB.
7. If no further data are expected from the S-GW, the eNB can initiate the suspension of the S1 connection and the deactivation of the S1-U bearers.
8. The eNB sends the RRCConnectionRelease message to keep the UE in RRC_IDLE. The message includes the release Cause set to rrc-Suspend, the resumeID, the NextHopChainingCount and drb-ContinueROHC which are stored by the UE. If downlink data were received in step 6, they are sent ciphered on DTCH multiplexed with the RRCConnectionRelease message on DCCH.

NOTE 1: If the MME or eNB decides the UE to move in RRC_CONNECTED mode, RRCConnectionResume message is sent in step 7 to fall back to the RRC Connection resume procedure. In that case, the RRCConnectionResume message is integrity protected and ciphered with the keys derived in step 1 and the UE ignores the NextHopChainingCount included in the RRCConnectionResume message. Downlink data can be transmitted on DTCH multiplexed with the RRCConnectionResume message. In addition, an RRCConnectionSetup can also be sent in step 7 to fall back to the RRC Connection establishment procedure.

NOTE 2: If neither RRCConnectionRelease nor, in case of fallback, RRCConnectionResume is received in response to RRCConnectionResumeRequest for EDT, the UE considers the UL data transmission not successful.

Figure 5:
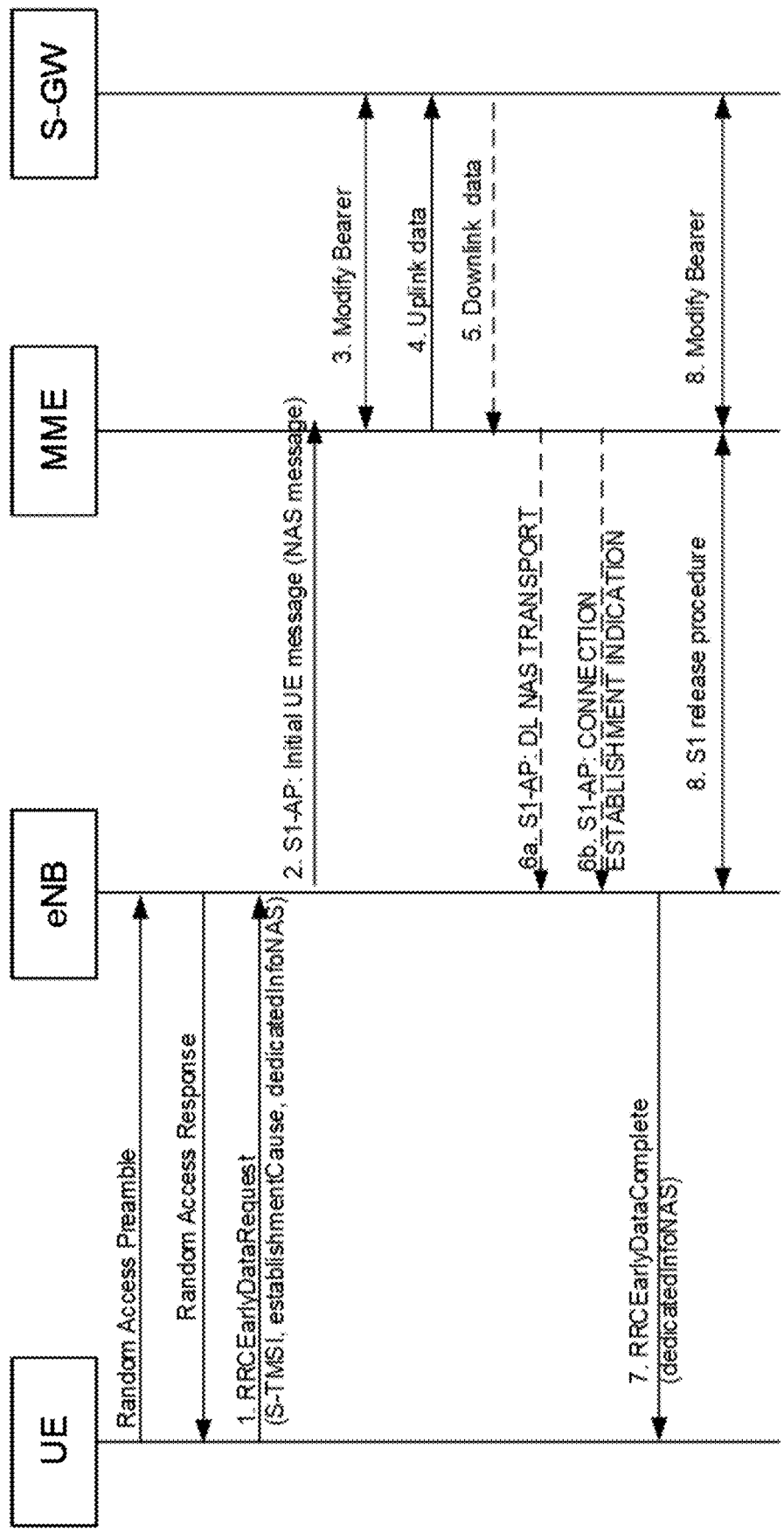
FIG. 5 is a diagram illustrating an exemplary scenario associated with Early Data Transmission (EDT) for Control Plane CIoT EPS optimizations according to one exemplary embodiment.
Figure 8:
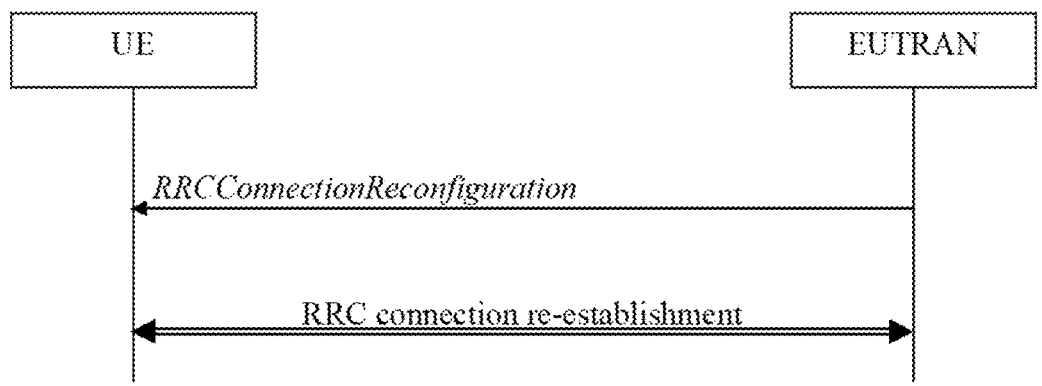
FIG. 8 is a diagram illustrating an exemplary scenario associated with RRC connection reconfiguration according to one exemplary embodiment.
Figure 9:
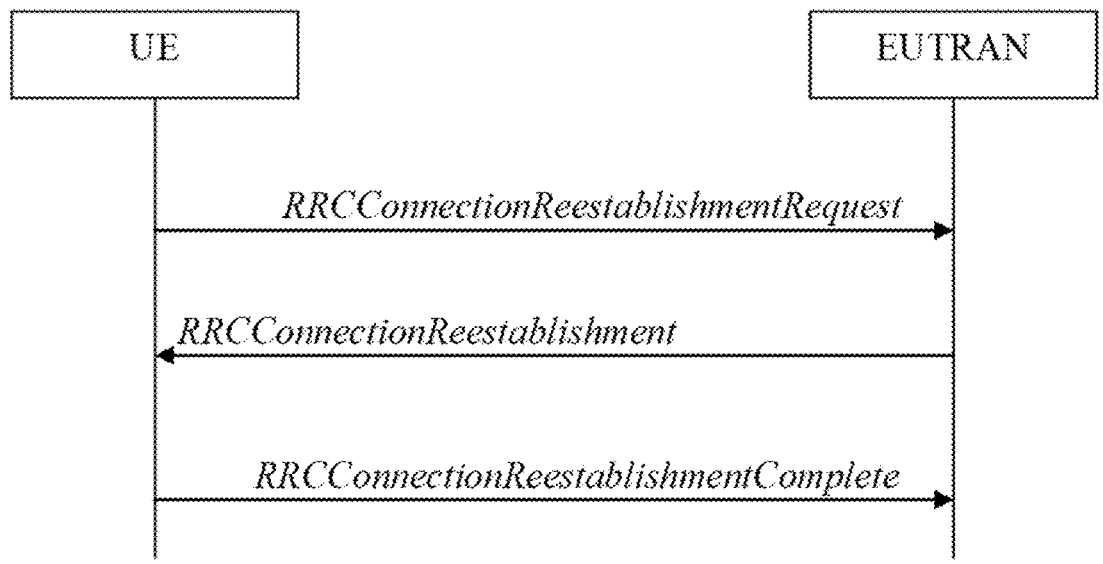
FIG. 9 is a diagram illustrating an exemplary scenario associated with RRC connection re-establishment according to one exemplary embodiment.
Figure 10:
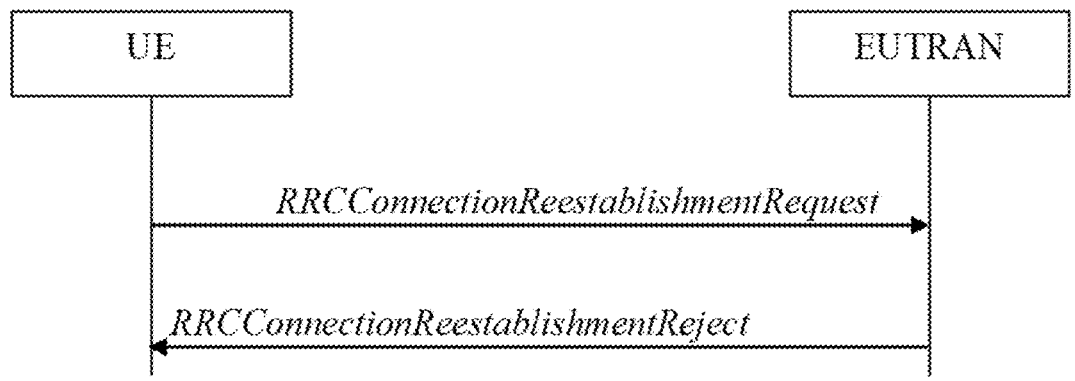
FIG. 10 is a diagram illustrating an exemplary scenario associated with RRC connection re-establishment according to one exemplary embodiment.

Description related to LTE Radio Resource Control (RRC) connection reconfiguration procedure (e.g., handover procedure) and LTE RRC connection re-establishment procedure is provided in 3GPP TS 36.331 V15.7.0. Notably, Figure 5.3.5.1-1 of Section 5.3.5.1 of 3GPP TS 36.331 V15.7.0, entitled "RRC connection reconfiguration, successful", is reproduced herein as FIG. 7. Figure 5.3.5.1-2 of Section 5.3.5.1 of 3GPP TS 36.331 V15.7.0, entitled "RRC connection reconfiguration, failure", is reproduced herein as FIG. 8. Figure 5.3.7.1-1 of Section 5.3.7.1 of 3GPP TS 36.331 V15.7.0, entitled "RRC connection re-establishment, successful", is reproduced herein as FIG. 9. Figure 5.3.7.1-2 of Section 5.3.7.1 of 3GPP TS 36.331 V15.7.0, entitled "RRC connection re-establishment, failure", is reproduced herein as FIG. 10. Parts of 3GPP TS 36.331 V15.7.0 are quoted below:

5.3.5 RRC Connection Reconfiguration 5.3.5.1 General

Figure 5.3.5.1-1: RRC Connection Reconfiguration, Successful

Figure 5.3.5.1-2: RRC Connection Reconfiguration, Failure

The purpose of this procedure is to modify an RRC connection, e.g. to establish/modify/release RBs, to perform handover, to setup/modify/release measurements, to add/modify/release SCells. As part of the procedure, NAS dedicated information may be transferred from E-UTRAN to the UE.

5.3.5.2 Initiation

E-UTRAN may initiate the RRC connection reconfiguration procedure to a UE in RRC_CONNECTED.

E-UTRAN applies the procedure as follows:
- the mobilityControlInfo is included only when AS-security has been activated, and SRB2 with at least one DRB are setup and not suspended;
- the establishment of RBs (other than SRB1, that is established during RRC connection establishment) is included only when AS security has been activated;
- the addition of SCells is performed only when AS security has been activated;

5.3.5.4 Reception of an RRCConnectionReconfiguration Including the mobilityControlInfo by the UE (Handover)

If the RRCConnectionReconfiguration message includes the mobilityControlInfo and the UE is able to comply with the configuration included in this message, the UE shall:
1> stop timer T310, if running;
1> stop timer T312, if running;
1> start timer T304 with the timer value set to t304, as included in the mobility ControlInfo;
1> stop timer T370, if running;
1> if the carrierFreq is included:
  2> consider the target PCell to be one on the frequency indicated by the carrierFreq with a physical cell identity indicated by the targetPhysCellId;
1> else:
  2> consider the target PCell to be one on the frequency of the source PCell with a physical cell identity indicated by the targetPhysCellId;

1> if T309 is running
2> stop timer T309 for all access categories;
2> perform the actions as specified in 5.3.16.4.
1> start synchronising to the DL of the target PCell;
NOTE 1: The UE should perform the handover as soon as possible following the reception of the RRC message triggering the handover, which could be before confirming successful reception (HARQ and ARQ) of this message.
1> if BL UE or UE in CE:
2> if sameSFN-Indication is not present in mobilityControlInfo:
3> acquire the MasterInformationBlock in the target PCell;
[ . . . ]
1> reset MCG MAC and SCG MAC, if configured;
1> release uplinkDataCompression, if configured;
1> re-establish PDCP for all RBs configured with pdcp-config that are established;
NOTE 2: The handling of the radio bearers after the successful completion of the PDCP re-establishment, e.g. the re-transmission of unacknowledged PDCP SDUs (as well as the associated status reporting), the handling of the SN and the HFN, is specified in TS 36.323 [8].
NOTE 2a: At handover the reestablishPDCP flag will be set for all RBs configured with NR PDCP in nr-RadioBearerConfig1 or nr-RadioBearerConfig2 TS 38.331 [82] which will cause the PDCP entity to be re-established also for these RBs.
1> re-establish MCG RLC and SCG RLC, if configured, for all RBs that are established;
[ . . . ]
1> apply the value of the newUE-Identity as the C-RNTI;
1> if the RRCConnectionReconfiguration message includes the fullConfig:
2> perform the radio configuration procedure as specified in 5.3.5.8;
1> configure lower layers in accordance with the received radioResourceConfigCommon;
1> if the received RRCConnectionReconfiguration message includes the rach-Skip:
2> configure lower layers to apply the rach-Skip for the target MCG, as specified in TS 36.213 [23] and 36.321 [6];
1> configure lower layers in accordance with any additional fields, not covered in the previous, if included in the received mobilityControlInfo;
(Remaining texts in subclause 5.3.5.4 are omitted herein . . . )

5.3.5.6 T304 Expiry (Handover Failure)
The UE shall:
1> if T304 expires (handover failure):
NOTE 1: Following T304 expiry any dedicated preamble, if provided within the rach-ConfigDedicated, is not available for use by the UE anymore.
2> revert back to the configuration used in the source PCell, excluding the configuration configured by the physicalConfigDedicated, the mac-MainConfig and the sps-Config;
NOTE 1 a: In the context above, "the configuration" includes state variables and parameters of each radio bearer. PDCP entities associated with RLC UM and SRB bearers are reset after the successful RRC connection re-establishment procedure according to clause 5.2 in TS 36.323 [8]. In the above, "the configuration" includes the RB configuration using NR PDCP, if configured (i.e. by nr-RadioBearerConfig1 and nr-RadioBearerConfig2).
2> store the following handover failure information in VarRLF-Report by setting its fields as follows:
[ . . . ]
2> initiate the connection re-establishment procedure as specified in 5.3.7, upon which the RRC connection reconfiguration procedure ends;
[ . . . ]

5.3.5.8 Radio Configuration Involving Full Configuration Option
The UE shall:
1> if the UE is connected to EPC:
2> release/clear all current dedicated radio configurations except for the following:
the MCG C-RNTI,
the MCG security configuration,
the PDCP, RLC, logical channel configurations for the RBs,
the logged measurement configuration;
[ . . . ]
1> if the RRCConnectionReconfiguration message includes the mobility ControlInfo:
2> release/clear all current common radio configurations;
2> use the default values specified in 9.2.5 for timer T310, T311 and constant N310, N311;
[ . . . ]
1> apply the default physical channel configuration as specified in 9.2.4;
1> apply the default semi-persistent scheduling configuration as specified in 9.2.3;
1> apply the default MAC main configuration as specified in 9.2.2;
1> if the UE is a NB-IoT UE; or
1> for each srb-Identity value included in the srb-ToAddModList (SRB reconfiguration):
2> apply the specified configuration defined in 9.1.2 for the corresponding SRB;
2> apply the corresponding default RLC configuration for the SRB specified in 9.2.1.1 for SRB1 or in 9.2.1.2 for SRB2;
2> apply the corresponding default logical channel configuration for the SRB as specified in 9.2.1.1 for SRB1 or in 9.2.1.2 for SRB2;
2> if the corresponding SRB was configured with NR PDCP and the UE is connected to EPC:
3> release the NR PDCP entity and establish it with an E-UTRA PDCP entity and with the current (MCG) security configuration;
NOTE 1 a: The UE applies the LTE ciphering and integrity protection algorithms that are equivalent to the previously configured NR security algorithms.
3> associate the RLC bearer of this SRB with the established PDCP entity;
NOTE 2: This is to get the SRBs (SRB1 and SRB2 for handover and SRB2 for reconfiguration after reestablishment) to a known state from which the reconfiguration message can do further configuration.
2> else if the UE is connected to 5GC:
3> apply the corresponding default PDCP configuration for the SRB as specified in TS 38.331 [82], clause 9.2.1;
1> if the UE is connected to EPC:
2> for each eps-BearerIdentity value included in the drb-ToAddModList or nr-RadioBearerConfig1 or nr- RadioBearerConfig2 that is part of the current E-UTRA and NR UE configuration:
3> release the E-UTRA or NR PDCP entity;
3> release the RLC entity or entities;
3> release the DTCH logical channel;
3> release the drb-identity;
NOTE 3: This will retain the eps-bearerIdentity but remove the DRBs including drb-identity of these bearers from the current UE configuration and trigger the setup of the DRBs within the AS in clause 5.3.10.3 using the new configuration. The eps-bearerIdentity acts as the anchor for associating the released and re-setup DRB. In the AS the DRB re-setup is equivalent with a new DRB setup (including new PDCP and logical channel configurations).
2> for each eps-BearerIdentity value that is part of the current E-UTRA and NR UE configuration but not added with same eps-BearerIdentity in drb-ToAddModList nor in nr-RadioBearerConfig1 nor in nr-RadioBearerConfig2:
3> perform DRB release as specified in 5.3.10.2;
[ . . . ]

5.3.7 RRC Connection Re-Establishment
5.3.7.1 General

Figure 5.3.7.1-1: RRC Connection Re-Establishment, Successful

Figure 5.3.7.1-2: RRC Connection Re-Establishment, Failure

The purpose of this procedure is to re-establish the RRC connection, which involves the resumption of SRB1 (SRB1bis for a NB-IoT UE for which AS security has not been activated) operation, the re-activation of security (except for a NB-IoT UE for which AS security has not been activated) and the configuration of only the PCell.

Except for a NB-IoT UE for which AS security has not been activated, a UE in RRC_CONNECTED, for which security has been activated, may initiate the procedure in order to continue the RRC connection. The connection re-establishment succeeds only if the concerned cell is prepared i.e. has a valid UE context. In case E-UTRAN accepts the re-establishment, SRB1 operation resumes while the operation of other radio bearers remains suspended. If AS security has not been activated, the UE does not initiate the procedure but instead moves to RRC_IDLE directly.

When AS security has not been activated, a NB-IoT UE supporting RRC connection re-establishment for the Control Plane CIoT EPS optimisation in RRC_CONNECTED may initiate the procedure in order to continue the RRC connection.

E-UTRAN applies the procedure as follows:
  When AS security has been activated:
    to reconfigure SRB1 and to resume data transfer only for this RB;
    to re-activate AS security without changing algorithms.
  For a NB-IoT UE supporting RRC connection re-establishment for the Control Plane CIoT EPS optimisation, when AS security has not been activated:
    to re-establish SRB1bis and to continue data transfer for this RB.

5.3.7.2 Initiation
The UE shall only initiate the procedure either when AS security has been activated or for a NB-IoT UE supporting RRC connection re-establishment for the Control Plane CIoT EPS optimisation. The UE initiates the procedure when one of the following conditions is met:
  1> upon detecting radio link failure, in accordance with 5.3.11; or
  1> upon handover failure, in accordance with 5.3.5.6; or
  1> upon mobility from E-UTRA failure, in accordance with 5.4.3.5; or
  1> except for UP-EDT, upon integrity check failure indication from lower layers concerning SRB1 or SRB2; or
  1> upon an RRC connection reconfiguration failure, in accordance with 5.3.5.5; or
  1> upon an RRC connection reconfiguration failure, in accordance with TS38.331 [82], clause 5.3.5.5.
  NOTE: For UP-EDT, integrity check failure indication from lower layers is handled in accordance with clause 5.3.3.16.

Upon initiation of the procedure, the UE shall:
  1> stop timer T310, if running;
  1> stop timer T312, if running;
  1> stop timer T313, if running;
  1> stop timer T307, if running;
  1> start timer T311;
  1> stop timer T370, if running;
  1> release uplinkDataCompression, if configured;
  1> suspend all RBs, including RBs configured with NR PDCP, except SRB0;
  1> reset MAC;
  1> release the MCG SCell(s), if configured, in accordance with 5.3.10.3a;
  1> release the SCell group(s), if configured, in accordance with 5.3.10.3d;
  1> apply the default physical channel configuration as specified in 9.2.4;
  1> except for NB-IoT, for the MCG, apply the default semi-persistent scheduling configuration as specified in 9.2.3;
  1> for NB-IoT, release schedulingRequestConfig, if configured;
  1> for the MCG, apply the default MAC main configuration as specified in 9.2.2;
  1> release powerPrefIndicationConfig, if configured and stop timer T340, if running;
  1> release reportProximityConfig, if configured and clear any associated proximity status reporting timer;
  1> release obtainLocationConfig, if configured;
  1> release idc-Config, if configured;
  1> release sps-AssistanceInfoReport, if configured;
  1> release measSubframePatternPCell, if configured;
  1> release the entire SCG configuration, if configured, except for the DRB configuration (as configured by drb-ToAddModListSCG);
  1> if (NG)EN-DC is configured:
    2> perform MR-DC release, as specified in TS 38.331 [82], clause 5.3.5.10;
    2> release p-MaxEUTRA, if configured;
    2> release p-MaxUE-FR1, if configured;
    2> release tdm-PatternConfig, if configured;
  1> release naics-Info for the PCell, if configured;
  1> if connected as an RN and configured with an RN subframe configuration:
    2> release the RN subframe configuration;
  1> release the LWA configuration, if configured, as described in 5.6.14.3;
  1> release the LWIP configuration, if configured, as described in 5.6.17.3;

1> release delayBudgetReportingConfig, if configured and stop timer T342, if running;
1> perform cell selection in accordance with the cell selection process as specified in TS 36.304 [4];
1> release bw-PreferenceIndicationTimer, if configured and stop timer T341, if running;
1> release overheatingAssistanceConfig, if configured and stop timer T345, if running;
1> release ailc-BitConfig, if configured;

5.3.7.3 Actions Following Cell Selection while T311 is Running

Upon selecting a suitable E-UTRA cell, the UE shall:
1> if T309 is running:
2> stop timer T309 for all access categories;
2> perform the actions as specified in 5.3.16.4.
1> if the UE is connected to 5GC and the selected cell is only connected to EPC; or
1> if the UE is connected to EPC and the selected cell is only connected to 5GC:
2> perform the actions upon leaving RRC_CONNECTED as specified in 5.3.12, with release cause 'RRC connection failure';
1> else:
2> stop timer T311;
2> start timer T301;
2> apply the timeAlignmentTimerCommon included in SystemInformationBlockType2;
2> if the UE is a NB-IoT UE supporting RRC connection re-establishment for the Control Plane CIoT EPS optimisation and AS security has not been activated; and
2> if cp-reestablishment is not included in SystemInformationBlockType2-NB:
3> perform the actions upon leaving RRC_CONNECTED as specified in 5.3.12, with release cause 'RRC connection failure';
2> else:
3> initiate transmission of the RRCConnectionReestablishmentRequest message in accordance with 5.3.7.4;
NOTE: This procedure applies also if the UE returns to the source PCell.

Upon selecting an inter-RAT cell, the UE shall:
1> if the selected cell is a UTRA cell, and if the UE supports Radio Link Failure Report for Inter-RAT MRO, include selectedUTRA-CellId in the VarRLF-Report and set it to the physical cell identity and carrier frequency of the selected UTRA cell;
1> perform the actions upon leaving RRC_CONNECTED as specified in 5.3.12, with release cause 'RRC connection failure';

5.3.7.6 T311 Expiry
Upon T311 expiry, the UE shall:
1> perform the actions upon leaving RRC_CONNECTED as specified in 5.3.12, with release cause 'RRC connection failure';

5.3.7.7 T301 Expiry or Selected Cell No Longer Suitable
The UE shall:
1> if timer T301 expires; or
1> if the selected cell becomes no longer suitable according to the cell selection criteria as specified in TS 36.304 [4]:
2> perform the actions upon leaving RRC_CONNECTED as specified in 5.3.12, with release cause 'RRC connection failure';

5.3.7.8 Reception of RRCConnectionReestablishmentReject by the UE
Upon receiving the RRCConnectionReestablishmentReject message, the UE shall:
1> perform the actions upon leaving RRC_CONNECTED as specified in 5.3.12, with release cause 'RRC connection failure';

Transmission in preconfigured uplink resources (PUR) is discussed in 3GPP RAN1. Some agreements made by RAN1 are quoted below from 3GPP RAN1 #96 Chairman's Note:
In idle mode, the TA validation configuration can include "PUR Time Alignment Timer"
  Where the UE considers the TA as invalid if the (current time−time at last TA update)>the PUR Time Alignment Timer
In idle mode, when the UE validates TA, the UE considers the TA for the previous serving cell as invalid if the serving cell changes
  Above applies for the case where the UE is configured to use the serving cell change attribute
When the UE is configured to use several TA validation criteria, the TA is valid only when all the configured TA validation criteria are satisfied.
For dedicated PUR, in idle mode, the PUR resource configuration includes at least the following
  Time domain resources including periodicity(s)
    Note: also includes number of repetitions, number of RUs, starting position
  Frequency domain resources
  TBS(s)/MCS(s)
  Power control parameters
  Legacy DMRS pattern Transmission in preconfigured uplink resources (PUR) is discussed in 3GPP RAN1. Some agreements made by RAN1 are quoted below from 3GPP RAN1 #96bis Chairman's Note:
For dedicated PUR in idle mode, the PUR configuration is configured by UE-specific RRC signaling.
In idle mode, a UE can be configured such that TA is always valid within a given cell.

Transmission in preconfigured uplink resources (PUR) is discussed in 3GPP RAN1. Some agreements made by RAN1 are quoted below from 3GPP RAN1 #98 Chairman's Note:
In idle mode, updating PUR configurations and/or PUR parameters via L1 signalling after a PUR transmission is supported
For dedicated PUR
  During the PUR search space monitoring, the UE monitors for DCI scrambled with a RNTI assuming that the RNTI is not shared with any other UE Transmission in preconfigured uplink resources (PUR) is discussed in 3GPP RAN1. Some agreements made by RAN1 are quoted below from 3GPP RAN1 #98bis Chairman's Note:
The dedicated PUR ACK DCI at least includes the Timing Advance adjustment (including TA adjustment of 0). The TA adjustment field is [6] bits as legacy.
For dedicated PUR in idle mode, the PUR configuration includes the following
  MPDCCH frequency hopping configuration
  PDSCH frequency hopping configuration
The PUR configuration includes the PUCCH configuration Transmission in preconfigured uplink resources (PUR) is discussed in 3GPP RAN2. Some agreements made by RAN2 are quoted below from R2-1914102:
  ⇒ Multi-shot D-PUR is supported with the possibility to configure as a single shot.
  ⇒ Network makes the decision on the D-PUR configuration.

⇒ The eNB can (re)configure and release D-PUR by dedicated RRC signalling.

⇒ The UE must release the D-PUR when it does a RA procedure on a new cell.

⇒ D-PUR configuration can be set up without a predefined end (infinite).

⇒ RRC response message needs to be supported by the UE and could be used in all cases.

⇒ For some cases L1 signalling is sufficient to acknowledge, i.e. RRC response message is not needed.

⇒ RAN2 assumes the L1 signalling for acknowledgement is sent only after the eNB determines there is no pending downlink data or signalling.

⇒ It is feasible to provide the UE with a UE-specific RNTI for D-PUR. Common or shared RNTI is also feasible.

⇒ The RNTI used for D-PUR is signalled together with other D-PUR configuration.

⇒ Valid TA is a requirement in order to initiate D-PUR transmission.

⇒ The UE may use the D-PUR resource to send RRC-ConnectionRequest or RRCConnectionResumeRequest to establish or resume RRC connection.

⇒ For the CP solution, the uplink data are encapsulated as a NAS PDU in an uplink RRC message transmitted in CCCH.

⇒ For the UP solution, the uplink data are transmitted in DTCH.

⇒ After the uplink D-PUR transmission, the UE monitors PDCCH under the control of a timer:
The timer starts after D-PUR transmission.
The timer restarts if a scheduling for D-PUR retransmission is received.
The UE considers that the D-PUR transmission has failed if the timer expires.
The timer is stopped when D-PUR procedure ends/succeeds.

⇒ The downlink RRC response message, if needed, for the CP solution may include the following optional information:
downlink data encapsulated as a NAS PDU (downlink application layer response or pending data in MME).
redirection information.
D-PUR (re-)configuration and release.

⇒ The downlink RRC response message for the UP solution may include the following optional information:
Resume ID.
NCC (mandatory)—the downlink RRC response message for the UP solution is always provided.
redirection information.
D-PUR (re-)configuration and release.

⇒ The MAC CE for TA update can be sent along with the RRC transmission of the downlink RRC response message for the CP solution and UP solution.

⇒ After reception of D-PUR transmission, the eNB can move the UE to RRC connection by RRCConnectionSetup message or RRCConnectionResume message.

⇒ TA validation criterion "Serving cell changes" is implicitly always enabled, which means that TA is considered invalid when the UE initiates RA procedure in a different cell than where TA was last validated.

⇒ Configuration for TA validation criteria is provided in dedicated RRC signaling.
It should be possible to disable each or all of the optional TA validation criteria (i.e., TA timer, (N)RSRP change) via RRC signaling.

⇒ UE keeps the PUR configuration while TA is considered invalid, but PUR cannot be used until eNB validates the existing TA/provides a new TA.

⇒ A new TA timer is defined for UEs configured with D-PUR in idle mode.
The (re)starting times for TA timer need to be aligned between UE and eNB.
TA timer is restarted after TA is updated.

⇒ UE-specific PUR (re)configuration can be provided while UE is in RRC_CONNECTED.

⇒ PUR (re)configuration can be included in RRC Connection Release.

⇒ At least the following information can be included in PUR (re)configurations:
"m" consecutive missed allocations before release.
Time Alignment Timer for idle mode.
RSRP change threshold for Serving cell.

⇒ PUR (re)configuration can be provided in DL RRC response message of the D-PUR procedure.

⇒ Delta configuration is supported for PUR reconfiguration.

⇒ If the UE performs EDT or moves to RRC_CONNECTED and comes back to RRC_IDLE in the same cell, PUR configuration remains valid unless specifically released or reconfigured by network or other triggers.

⇒ PUR can be released explicitly by RRCConnectionRelease message and DL RRC response message of the D-PUR procedure.

⇒ For CP solution AS RAI, BSR are not included with PUR transmission.

⇒ For the CP solution, MAC CE for TA update can be sent without downlink RRC response message. (For UP RRC response message is always required).

⇒ In case the UE moves to RRC-CONNECTED, a new C-RNTI can be provided in RRC. If absent the UE maintains the PUR-RNTI as C-RNTI.

⇒ Working assumption: PUR is indicated as enabled in the cell using a flag in SIB2. Upon detecting that SIB indication of PUR support is turned off in the cell, UE shall release all PUR configurations. Existing SIB update mechanism is used to update the indication.

⇒ PUR configuration can be provided without PUR Configuration Request from the UE, therefore optional radio access capabilities (separate for UP and CP) to indicate UE is capable of performing UL transmissions using PUR are introduced.

⇒ UE cannot be configured with more than one PUR configuration
Therefore, PUR config identity/index is not needed in PUR configuration ⇒ Information on TBS size is provided in PUR configuration.
Exact details also depend on RAN1 agreements.

⇒ For CP, similar to EDT, "the size of the resulting MAC PDU including the total UL data is expected to be smaller than or equal to the TBS configured for PUR" is a precondition before initiating UL transmission using PUR.
Sending RRC Connection request without the CP data is not excluded due to this.

⇒ For UP, refer to PUR messages as "RRCConnectionResumeRequest for PUR" and "RRCConnectionResumeRequest for EDT or PUR" etc. in the specifications.

⇒ PUR TA timer is configurable up to hour(s) level, disabled/infinity is possible.

The term "Machine-Type Communications UE (MTC UE)", as used herein, may refer to a "Bandwidth reduced and Low complexity UE (BL UE)" and/or a "UE in enhanced coverage (UE in EC, UE in CE, CE UE)". The term "UE", as used herein, may refer to a MTC UE and/or a Narrow Band Internet of Things (NB-IoT) UE and/or a different type of UE. In RRC_IDLE state (e.g., Radio Resource Control (RRC) idle state), if a UE initiates a Random Access (RA) procedure, the random access procedure may be for Early-Data Transmission (EDT) and/or the random access procedure may not be for EDT. A contention-based random access procedure may comprise four steps, wherein messages transmitted and/or received in each step of the four steps are referred to as "Msg1", "Msg2", "Msg3", and/or "Msg4", respectively. A non-contention-based random access procedure may comprise two steps, wherein messages transmitted and/or received in each step of the two steps are referred to as "Msg1", and/or "Msg2", respectively. The term "Physical Downlink Control Channel (PDCCH)", as used herein, may refer to a Machine-Type Communications PDCCH (MPDCCH) for MTC UEs and/or a Narrowband PDCCH (NPDCCH) for NB-IoT UEs. The term "Physical Random Access Channel (PRACH)", as used herein, may refer to PRACH for MTC UEs and/or Narrowband PRACH (NPRACH) for NB-IoT UEs. The statement(s) described above in this paragraph may be generally applied to all the following paragraphs, unless otherwise specified.

In LTE Release 15, EDT is introduced in order to improve transmission efficiency and/or reduce power consumption for MTC UEs and/or NB-IoT UEs. EDT may be applicable for MTC UEs and/or NB-IoT UEs. EDT may be triggered in RRC_IDLE state. After EDT is triggered, uplink user data (e.g. Mobile Originated data) may be included in a Msg3 during a random access procedure (e.g., Msg3 may correspond to a third message of the random access procedure), and a network may include downlink user data in Msg4 during the random access procedure (e.g., Msg4 may correspond to a fourth message of the random access procedure). One benefit of EDT is that uplink user data may be transmitted by a UE without the need for the UE to enter RRC_CONNECTED state (e.g., RRC connected state). It is also possible that EDT fallbacks to legacy RRC connection establishment/resume procedure, and/or that the uplink user data is transmitted after the UE enters RRC_CONNECTED state. The Release 15 EDT may also be referred to as "Mobile-originated EDT (MO-EDT)".

There are at least two types of EDT (or MO-EDT).

A first type of EDT (or a first type of MO-EDT) is control plane EDT (CP-EDT) (e.g., EDT for Control Plane Cellular Internet of Things (CIoT) Evolved Packet System (EPS) optimizations). In CP-EDT, uplink user data is transmitted in a Non-Access Stratum (NAS) message concatenated in an uplink RRCEarlyDataRequest message on a Common Control Channel (CCCH). The uplink RRCEarlyDataRequest message may be included in a Msg3 during a random access procedure (e.g., the Msg3 may correspond to a third message of the random access procedure, where the Msg3 is transmitted by a UE to an eNB). Downlink user data may be transmitted in a NAS message concatenated in a downlink RRCEarlyDataComplete message on a CCCH. The downlink RRCEarlyDataComplete message may be included in a Msg4 during the random access procedure (e.g., the Msg4 may correspond to a fourth message of the random access procedure, where the Msg4 is transmitted by the eNB to the UE). If a Mobility Management Entity (MME) and/or the eNB decide to change the UE to RRC_CONNECTED mode (e.g., change the UE from RRC_IDLE mode to RRC_CONNECTED mode), a RRCConnectionSetup message may be sent (to the UE) in Msg4 to fall back to the legacy RRC Connection establishment procedure.

A second type of EDT (or a second type of MO-EDT) is user plane EDT (UP-EDT) (e.g., EDT for User Plane CIoT EPS optimizations). In UP-EDT, uplink user data is transmitted on a Dedicated Traffic Channel (DTCH) multiplexed with an uplink RRCConnectionResumeRequest message on a CCCH. In some embodiments, a DTCH Service Data Unit (SDU) and/or a CCCH SDU are included in a Msg3 during a random access procedure (e.g., the Msg3 may correspond to a third message of the random access procedure, where the Msg3 is transmitted by a UE to an eNB). Downlink user data may be transmitted on a DTCH multiplexed with a downlink RRCConnectionRelease message on a Dedicated Control Channel (DCCH). A DTCH SDU and/or a DCCH SDU may be included in a Msg4 during the random access procedure. If a MME and/or the eNB decide to change the UE to RRC_CONNECTED mode (e.g., change the UE from RRC_IDLE mode to RRC_CONNECTED mode), a RRCConnectionResume message (and/or downlink user data) is sent (to the UE) in the Msg4 to fall back to the RRC Connection resume procedure.

In LTE Release 16, transmission in preconfigured uplink resources (PUR) may be introduced in order to further improve transmission efficiency and/or reduce power consumption for MTC UEs and/or NB-IoT UEs. The PUR may be a dedicated PUR. The term "dedicated PUR", as used herein, may correspond to one or more resources that the UE assumes are not shared with other UEs.

In some embodiments, the UE performs a PUR transmission (e.g., a transmission of data to a network via one or more PURs) on a PUR (e.g., a PUR occasion) in RRC_IDLE state. In some embodiments, the UE determines the PUR (e.g., the PUR occasion) based upon time and frequency information of one or more PURs configured in a dedicated PUR configuration of the UE. For example, the dedicated PUR configuration may indicate one or more PURs for the UE to perform a transmission in a cell (e.g., a cell where the dedicated PUR configuration received and/or is valid) when the UE is in RRC_IDLE state. HARQ is supported for one or more transmissions using a dedicated PUR to improve reliability. After the UE performs the PUR transmission, the UE monitors PDCCH during a configurable time period (e.g., a PUR Search Space Window and/or a PUR Search Space Timer). The network may include a PUR search space configuration in the dedicated PUR configuration and/or the UE may monitor PDCCH based upon the PUR search space configuration after the PUR transmission (e.g., the PUR search space configuration may correspond to the configurable time period). In addition, one or more fallback mechanisms to RACH and/or EDT procedures may also be supported. Details of the one or more fallback mechanisms are under discussion.

The UE may be configured with PUR by receiving a dedicated PUR configuration (such as for a cell). The dedicated PUR configuration may be provided (such as in the cell) in a dedicated signaling (e.g., RRCConnectionRelease message) to the UE when the UE is in RRC_CONNECTED mode. One or more configured PURs (e.g., one or more PURs indicated by and/or configured by the dedicated PUR configuration) may be valid when the UE is in RRC_IDLE mode (and when the UE is in the cell associated with the dedicated PUR configuration). The one or more configured PURs may not require lower layer activation. The UE may not use the one or more configured PURs if no data is available for transmission. For one or more dedicated PURs, because the network can identify which UE is performing a transmission using the one or more dedicated PURs, contention resolution may not be needed. In some embodiments, the UE may perform two steps. A first step of the two steps comprises the transmission using PUR, and a second step of the two steps comprises reception of a network response associated with the transmission (e.g., the network response is also known as a "response for PUR" and/or a "PUR response"). The network response may be an acknowledgement of whether the transmission is successful or not (e.g., the network response may comprise HARQ feedback and/or L1-ACK). The network response may be a dynamic uplink grant for retransmission (e.g., the network response may be the dynamic uplink grant for retransmission if the transmission is not successful). The network response may be downlink user data and/or a RRC message (e.g., at least one of a RRCEarlyDataComplete message, a RRCConnectionRelease message, etc.). The downlink user data and/or the RRC message may be scheduled by a dynamic downlink assignment. The dynamic uplink grant may be addressed to a first specific RNTI (e.g., a C-RNTI, a Temporary C-RNTI and/or a new RNTI for PUR such as PUR-RNTI). The dynamic downlink assignment may be addressed to a second specific RNTI (e.g., a C-RNTI, a Temporary C-RNTI and/or a new RNTI for PUR such as PUR-RNTI). The first specific RNTI and/or the second specific RNTI may be provided in the dedicated PUR configuration. The first specific RNTI and/or the second specific RNTI may be provided when UE is in RRC_CONNECTED state. The first specific RNTI and the second specific RNTI may be the same (i.e. the first specific RNTI and the second specific RNTI may both correspond to a single RNTI). Alternatively and/or additionally, the first specific RNTI may be different than the second specific RNTI. If retransmission is required, such as where the transmission is not successful, the UE may perform retransmission in a next PUR occasion and/or based upon the dynamic uplink grant (received in the second step). The UE monitors PDCCH during the configurable time period (e.g., the PUR Search Space window and/or the PUR Search Space timer) for receiving the network response. In some embodiments, the network response may indicate fallback to RACH procedure and/or EDT procedure (such as in a scenario in which the transmission is not successful).

According to RAN1 and RAN 2 agreements (at least some of which are quoted in the foregoing description), a UE may use one or more dedicated PURs in RRC_IDLE state if criteria are met. The criteria may comprise valid Time Alignment (TA) (e.g., the criteria may comprise one or more other criteria, other than whether the TA is valid, as well). A validation mechanism for TA (e.g., a mechanism by which the UE can determine whether or not TA associated with the UE is valid) may comprise a PUR TA timer. In some embodiments, the PUR TA timer is different than an existing timeAlignmentTimer. For example, conditions for starting, restarting and/or stopping the PUR TA timer may be different than conditions for starting, restarting and/or stopping the existing timeAlignmentTimer. If the PUR TA timer is configured for the UE, the UE may consider that TA (for PUR) associated with the UE is valid if the PUR TA timer is running and/or if other criteria (e.g., all other criteria) for TA validation of PUR are met. If the PUR TA timer is configured for the UE, the UE may consider that TA (for PUR) associated with the UE is invalid if the PUR TA timer is not running (and/or if the PUR TA timer has expired). A configuration of the PUR TA timer may be included in the dedicated PUR configuration (e.g., the UE may be configured with the PUR TA timer using the dedicated PUR configuration). The validation mechanism for TA may comprise "Serving Cell Change" (e.g., a serving cell associated with the UE may be changed to a different cell such as due to cell reselection, where the different cell is different than a cell where the dedicated PUR configuration is valid and/or where the UE was configured with the dedicated PUR configuration). The UE may consider the TA for the previous serving cell to be invalid if the serving cell changes. Alternatively and/or additionally, the UE may consider the TA to be invalid when the UE initiates a random access procedure in a cell that is different than a cell where the TA was most recently validated. In an example, the UE may perform a first PUR transmission on a first cell, receive a first PUR response on the first cell, and then initiate a random access procedure on a second cell. In the example, the UE may consider the TA to be invalid when (and/or after) the UE initiates the random access procedure on the second cell.

In some embodiments, the UE keeps (i.e., does not release) the dedicated PUR configuration when the UE considers the TA (for PUR) to be invalid (e.g., the UE may keep the dedicated PUR configuration during a time period when the UE is in RRC_CONNECTED state and/or in RRC_IDLE state and the UE considers TA (for PUR) to be invalid). The UE may keep (i.e., may not release) the dedicated PUR configuration when a serving cell associated with the UE is changed (e.g., in RRC_CONNECTED state and/or in RRC_IDLE state). For example, the UE may keep (i.e., may not release) the dedicated PUR configuration when a serving cell of the UE is changed (such as to a cell other than where the dedicated PUR configuration was configured and/or valid) in RRC_IDLE state. The UE does not perform PUR transmission when TA (for PUR) associated with the UE is invalid, and the UE could perform PUR transmission after the TA (for PUR) associated with the UE becomes valid. In some embodiments, the UE keeps (i.e., does not release) the dedicated PUR configuration upon (and/or in response to) performing EDT and/or entering RRC_CONNECTED state (on the same serving cell where the dedicated PUR configuration is configured and/or valid). The UE may not perform PUR transmission in a time period during which the dedicated PUR configuration is kept and the UE is in RRC_CONNECTED state.

An implicit release mechanism is introduced for PUR. The UE maintains a counter 'm' if a corresponding threshold (and/or a release mechanism attribute) is configured in the dedicated PUR configuration. In some embodiments, if the UE does not perform (and/or skips) a PUR transmission on a PUR occasion, the UE increments the counter 'm' by 1 (e.g., the UE may increment the counter 'm' by 1 in response to not performing and/or skipping a PUR transmission on a PUR occasion). If the counter 'm' reaches (or exceeds) the corresponding threshold for 'm', the UE autonomously releases the dedicated PUR configuration (e.g., the UE may release the dedicated PUR configuration in response to the counter 'm' reaching (or exceeding) the corresponding threshold). The UE may not increment the counter 'm' while the UE is in RRC_CONNECTED state. The UE may reset the value of the counter 'm' (e.g., resetting the value of the counter 'm' may comprise setting the counter 'm' to zero) after (e.g., in response to) successful communication between the UE and a network (e.g., the successful communication may correspond to communication between the UE and the network when the UE is in RRC_IDLE or RRC_CONNECTED state).

In accordance with RAN2 agreements (at least some of which are quoted in the foregoing description), the dedicated PUR configuration should be kept after the UE enters RRC_CONNECTED state in the same serving cell (e.g., the serving cell where the UE received the dedicated PUR configuration and/or where the dedicated PUR configuration is valid) so that the dedicated PUR configuration may later be used (e.g., re-used) after the UE enters RRC_IDLE state (in the same serving cell). Although the dedicated PUR configuration is kept, the UE may be dynamically scheduled by the network in RRC_CONNECTED state. As compared to PUR, dynamic scheduling may be more flexible in terms of transmission power, Transport Block Size (TBS) and/or transmission timing. As compared to usage of PUR in RRC_IDLE state, there may be less benefits in using PUR in RRC_CONNECTED state. Further, if the UE performs a PUR transmission in RRC_CONNECTED state, the UE may need to monitor a specific RNTI for PUR in addition to a Cell Radio Network Temporary Identifier (C-RNTI), which increases the complexity in connected mode PDCCH monitoring.

One way to prevent and/or prohibit the UE from using PUR in RRC_CONNECTED state is to consider the TA for PUR to be invalid while the UE is in RRC_CONNECTED state.

In an example, the UE may stop the PUR TA timer upon and/or in response to entering RRC_CONNECTED state (e.g., when the PUR TA timer is stopped by the UE, the UE may consider TA for PUR to be invalid due to the PUR TA timer not running). Alternatively and/or additionally, the UE may stop the PUR TA timer upon and/or in response to receiving a RRCConnectionSetup message and/or a RRCConnectionResume message. Alternatively and/or additionally, the UE may stop the PUR TA timer upon and/or in response to receiving a dedicated configuration for time-AlignmentTimer (e.g., timeAlignmentTimerDedicated in a MAC-MainConfig).

In an example (of preventing and/or prohibiting the UE from using PUR in RRC_CONNECTED state), the UE may consider the PUR TA timer to be expired upon and/or in response to entering RRC_CONNECTED state (e.g., when the PUR TA timer is considered to be expired, the UE may consider the TA for PUR to be invalid due to the PUR TA Timer being expired). Alternatively and/or additionally, the UE may consider the PUR TA timer to be expired upon and/or in response to receiving a RRCConnectionSetup message and/or a RRCConnectionResume message. Alternatively and/or additionally, the UE could consider the PUR TA timer to be expired upon and/or in response to receiving a dedicated configuration for timeAlignmentTimer (e.g., timeAlignmentTimerDedicated in the MAC-MainConfig).

Another way to prevent and/or prohibit the UE from using PUR in RRC_CONNECTED state is to consider a state of PUR, associated with the UE, to be "suspended". In an example, the UE may consider the state of PUR to be "suspended" upon and/or in response to entering RRC_CONNECTED state. When the UE considers the state of PUR to be "suspended" the UE may not use PUR. Accordingly, the UE may not use PUR during RRC_CONNECTED state. The UE may consider the state of PUR to be "resumed" upon and/or in response to entering RRC_IDLE state (e.g., the UE may consider the state of PUR to be "resumed" upon and/or in response to entering RRC_IDLE state if the dedicated PUR configuration is not released by the network, such as prior to the UE entering the RRC_IDLE state). When the UE considers the state of PUR to be "resumed" the UE may use PUR. Accordingly, the UE may use PUR during RRC_IDLE state.

In some examples, the UE may not be prevented and/or prohibited from using PUR in RRC_CONNECTED state (e.g., the UE may be allowed to use PUR in RRC_CONNECTED state).

In some embodiments, the UE may not start the PUR TA timer in response to a TA update (e.g., the TA update may correspond to a TA Command MAC control element received by the UE) in RRC_CONNECTED state.

In RRC_CONNECTED state, the network may trigger handover associated with the UE, e.g., the network may trigger handover to handover the UE from one cell to another cell. Handover may be used to change the serving cell (e.g., a Primary Cell (PCell)) of the UE from a source cell to a target cell. The handover may be intra-cell handover (i.e., the target cell is the same as the source cell) or inter-cell handover (i.e., the target cell is different than the source cell). In LTE, the UE initiates a handover procedure (such as to handover the UE from one cell to another cell) upon reception of a RRCConnectionReconfiguration message comprising mobilityControlInfo. The UE may initiate a random access procedure on the target cell in order to transmit a RRCConnectionReconfigurationComplete message to the target cell.

In accordance with RAN2 agreements (at least some of which are quoted in the foregoing description), the network may provide the dedicated PUR configuration in RRCConnectionRelease message while the UE is in RRC_CONNECTED state. In an example where the network provides the dedicated PUR configuration in the RRCConnectionRelease message while the UE is in RRC_CONNECTED state, the UE enters RRC_IDLE state in response to applying the RRCConnectionRelease message. In some examples where the PUR is used in RRC_IDLE state and is not used in RRC_CONNECTED state, there may be no need for the network to configure and/or reconfigure the dedicated PUR configuration to the UE if the UE is to remain in RRC_CONNECTED state after configuration and/or reconfiguration of the dedicated PUR configuration (e.g., there may be no need for the network to configure and/or reconfigure the dedicated PUR configuration to the UE before the UE is to enter RRC_IDLE state). Accordingly, there may be no need for the network to configure and/or reconfigure PUR via a RRCConnectionReconfiguration procedure.

A scenario may occur in which a UE, keeping a dedicated PUR configuration (such as a dedicated PUR configuration received in a current serving cell or a source cell of a handover) in RRC_CONNECTED state of the UE, initiates a handover procedure (such as to generate a RRCConnectionReconfigurationComplete message and/or to initiate a Random Access procedure on a target cell of the handover) in response to reception of a RRCConnectionReconfiguration message comprising mobilityControlInfo (e.g., a mobilityControlInfo information element). In this scenario, it is unclear whether or not the dedicated PUR configuration is still valid after the handover procedure is successfully completed. The UE should not keep the dedicated PUR configuration if the dedicated PUR configuration is not valid anymore. For example, if the UE uses an invalid PUR configuration to perform transmission, resource collision with a second UE may occur, resulting in transmission failure for one or both of the UE and the second UE. Alternatively and/or additionally, if the UE releases the dedicated PUR configuration, the UE is not able to perform transmission using resources configured in the dedicated PUR configuration.

Techniques are provided herein, which when implemented, solve the aforementioned issues, such as at least one of a UE not being able to determine whether to keep or release a dedicated PUR configuration, a UE not being able to determine whether or not a dedicated PUR configuration is valid, a UE using an invalid PUR configuration to perform transmission, resource collision with another UE as a result of the transmission, a UE not being able to perform transmission using resources configured in a dedicated PUR configuration if the UE releases the dedicated PUR configuration, etc.

In a first example embodiment of the present disclosure, a UE may release a dedicated PUR configuration in response to reception of a RRCConnectionReconfiguration message comprising mobilityControlInfo. A handover procedure may be triggered by the RRCConnectionReconfiguration message comprising mobilityControlInfo. For example, the handover procedure may be performed to change a serving cell of the UE from a source cell to a target cell (e.g., the target cell may be indicated and/or identified in the mobilityControlInfo of the RRCConnectionReconfiguration message). In some examples, the UE may initiate the handover procedure in response to receiving the RRCConnectionReconfiguration message comprising mobilityControlInfo. The source cell may correspond to a serving cell of the UE where the dedicated PUR configuration is received and/or valid (e.g., the UE may receive the dedicated PUR configuration from the source cell).

In some examples, the UE may release the dedicated PUR configuration when the UE receives the RRCConnectionReconfiguration message comprising mobilityControlInfo (and/or upon and/or in response to the UE receiving the RRCConnectionReconfiguration message comprising mobilityControlInfo). For example, the UE may release the dedicated PUR configuration before or after acknowledging (such as to a network) the reception of the RRCConnectionReconfiguration message comprising mobilityControlInfo (e.g., the UE may acknowledge the reception by transmitting an indication of acknowledgment to the network). Alternatively and/or additionally, the UE may release the dedicated PUR configuration before or after starting synchronizing to a downlink of the target cell. Alternatively and/or additionally, the UE may release the dedicated PUR configuration before or after resetting MAC, such as associated with the source cell. Alternatively and/or additionally, the UE may release the dedicated PUR configuration before or after applying a value of the newUE-Identity as the C-RNTI. Alternatively and/or additionally, the UE may release the dedicated PUR configuration before or after performing a radio configuration procedure (e.g., a radio configuration procedure discussed in subclause 5.3.5.8 of 3GPP TS 36.331 V15.7.0). Alternatively and/or additionally, the UE may release the dedicated PUR configuration during the radio configuration procedure. Alternatively and/or additionally, the UE may release the dedicated PUR configuration before or after initiating a random access procedure on the target cell. Alternatively and/or additionally, the UE may release the dedicated PUR configuration before or after the random access procedure on the target cell is successfully completed.

Alternatively and/or additionally, the UE may release the dedicated PUR configuration in response to acknowledging (such as to the network) the reception of the RRCConnectionReconfiguration message comprising mobilityControlInfo. Alternatively and/or additionally, the UE may release the dedicated PUR configuration in response to starting synchronizing to the downlink of the target cell. Alternatively and/or additionally, the UE may release the dedicated PUR configuration in response to resetting MAC, such as associated with the source cell. Alternatively and/or additionally, the UE may release the dedicated PUR configuration in response to applying the value of the newUE-Identity as the C-RNTI. Alternatively and/or additionally, the UE may release the dedicated PUR configuration in response to performing the radio configuration procedure (e.g., a radio configuration procedure discussed in subclause 5.3.5.8 of 3GPP TS 36.331 V15.7.0). Alternatively and/or additionally, the UE may release the dedicated PUR configuration in response to initiating the random access procedure on the target cell. Alternatively and/or additionally, the UE may release the dedicated PUR configuration in response to the random access procedure on the target cell being successfully completed.

In some examples, the source cell may be the same as the target cell (e.g., the target cell indicated in the mobilityControlInfo of the RRCConnectionReconfiguration message). For example, the UE may release the dedicated PUR configuration (such as in response to reception of the RRCConnectionReconfiguration message comprising mobilityControlInfo) even if the source cell is the same as the target cell.

In some examples, the UE may release the dedicated PUR configuration regardless of whether or not the target cell is the same as the source cell.

In some examples, the RRCConnectionReconfiguration message comprising mobilityControlInfo may not comprise "fullConfig".

In some examples, the UE may release the dedicated PUR configuration without initiating a random access procedure during the handover procedure (e.g., the UE may release the dedicated PUR configuration without initiating any random access procedure during the handover procedure). For example, the UE may release the dedicated PUR configuration in response to receiving the RRCConnectionReconfiguration message comprising mobilityControlInfo, and the UE may fail to synchronize to a downlink of the target cell and thus may not initiate a random access procedure during the handover procedure.

In a second example embodiment of the present disclosure, a UE may keep a dedicated PUR configuration in response to reception of a RRCConnectionReconfiguration message comprising mobilityControlInfo. A handover procedure may be triggered by the RRCConnectionReconfiguration message comprising mobilityControlInfo. For example, the handover procedure may be performed to change a serving cell of the UE from a source cell to a target cell (e.g., the target cell may be indicated and/or identified in the mobilityControlInfo of the RRCConnectionReconfiguration message). In some examples, the UE may initiate the handover procedure in response to receiving the RRCConnectionReconfiguration message comprising mobilityControlInfo. The source cell may correspond to a serving cell of the UE where the dedicated PUR configuration is received and/or valid (e.g., the UE may receive the dedicated PUR configuration from the source cell).

The UE may not release the dedicated PUR configuration, such as due to the handover procedure.

In some examples, the UE may keep the dedicated PUR configuration during the handover procedure, such as while the handover procedure is still ongoing. Alternatively and/or additionally, the UE may keep the dedicated PUR configuration in response to (and/or after) successful completion of the handover procedure.

In some examples, after the handover procedure successfully completes, the network may determine and/or decide whether or not the UE should release the dedicated PUR configuration.

In some examples, the source cell may be different than the target cell (e.g., the target cell indicated in the mobilityControlInfo of the RRCConnectionReconfiguration message). For example, the UE may keep the dedicated PUR configuration (such as in response to reception of the RRCConnectionReconfiguration message comprising mobilityControlInfo) even if the source cell is different than the target cell.

In some examples, the UE may determine whether to keep the dedicated PUR configuration or to release the dedicated PUR configuration upon (and/or in response to) entering RRC_IDLE state, based upon whether or not a current serving cell (e.g., PCell) of the UE is the same as a first cell (e.g., the UE may determine and/or check whether or not the current serving cell of the UE is the same as the first cell). The UE may keep the dedicated PUR configuration if the current serving cell is the same as the first cell (e.g., the UE may determine to keep the dedicated PUR configuration based upon the current serving cell being the same as the first cell). Alternatively and/or additionally, the UE may release the dedicated PUR configuration if the current serving cell is different than the first cell (e.g., the UE may determine to release the dedicated PUR configuration based upon the current serving cell being different than the first cell).

The first cell may be a cell from which the UE received the dedicated PUR configuration. Alternatively and/or additionally, the first cell may be a cell associated with the dedicated PUR configuration. Alternatively and/or additionally, the first cell may be a cell in which the dedicated PUR configuration is valid. Alternatively and/or additionally, the first cell may be a cell in which the UE enters RRC_CONNECTED state before entering RRC_IDLE state. Alternatively and/or additionally, the first cell may correspond to the source cell.

In some examples, the UE may perform the determination (of whether to keep the dedicated PUR configuration or to release the dedicated PUR configuration) in response to reception of a RRCConnectionRelease message from the current serving cell. Alternatively and/or additionally, the UE may perform the determination in response to reception of a RRCConnectionRelease message, that does not comprise another PUR configuration other than the dedicated PUR configuration, from the current serving cell. In some examples, in response to performing the determination, the UE may release or keep the dedicated PUR configuration in accordance with the determination.

In a third example embodiment of the present disclosure, a UE may determine whether to release a dedicated PUR configuration or to keep the dedicated PUR configuration based upon whether or not a target cell is the same as a source cell. A handover procedure may be triggered, such as by a RRCConnectionReconfiguration message comprising mobilityControlInfo. The handover procedure may be performed to change a serving cell of the UE from the source cell to the target cell (e.g., the target cell may be indicated and/or identified in the mobilityControlInfo of the RRCConnectionReconfiguration message). In some examples, the UE may initiate the handover procedure in response to receiving the RRCConnectionReconfiguration message comprising mobilityControlInfo. The source cell may correspond to a serving cell of the UE where the dedicated PUR configuration is received and/or valid (e.g., the UE may receive the dedicated PUR configuration from the source cell).

In some examples, if the target cell is the same as the source cell, the UE may keep the dedicated PUR configuration (e.g., the UE may determine to keep the dedicated PUR configuration based upon the target cell being the same as the source cell). Alternatively and/or additionally, if the target cell is different than the source cell, the UE may release the dedicated PUR configuration (e.g., the UE may determine to release the dedicated PUR configuration based upon the target cell being different than the source cell).

In some examples, the UE may perform the determination (of whether to keep the dedicated PUR configuration or to release the dedicated PUR configuration) when the UE receives the RRCConnectionReconfiguration message comprising mobilityControlInfo (and/or the UE may perform the determination upon and/or in response to the UE receiving the RRCConnectionReconfiguration message comprising mobilityControlInfo). For example, the UE may perform the determination before or after acknowledging (such as to a network) the reception of the RRCConnectionReconfiguration message comprising mobilityControlInfo (e.g., the UE may acknowledge the reception by transmitting an indication of acknowledgment to the network). Alternatively and/or additionally, the UE may perform the determination before or after starting synchronizing to a downlink of the target cell. Alternatively and/or additionally, the UE may perform the determination before or after resetting MAC, such as associated with the source cell. Alternatively and/or additionally, the UE may perform the determination before or after applying a value of the newUE-Identity as the C-RNTI. Alternatively and/or additionally, the UE may perform the determination before or after performing a radio configuration procedure (e.g., a radio configuration procedure discussed in subclause 5.3.5.8 of 3GPP TS 36.331 V15.7.0). Alternatively and/or additionally, the UE may perform the determination during the radio configuration procedure. Alternatively and/or additionally, the UE may perform the determination before or after initiating a random access procedure on the target cell. Alternatively and/or additionally, the UE may perform the determination before or after the random access procedure on the target cell is successfully completed.

Alternatively and/or additionally, the UE may perform the determination in response to acknowledging (such as to the network) the reception of the RRCConnectionReconfiguration message comprising mobilityControlInfo. Alternatively and/or additionally, the UE may perform the determination in response to starting synchronizing to the downlink of the target cell. Alternatively and/or additionally, the UE may perform the determination in response to resetting MAC, such as associated with the source cell. Alternatively and/or additionally, the UE may perform the determination in response to applying the value of the newUE-Identity as the C-RNTI. Alternatively and/or additionally, the UE may perform the determination in response to performing the radio configuration procedure (e.g., a radio configuration procedure discussed in subclause 5.3.5.8 of 3GPP TS 36.331 V15.7.0). Alternatively and/or additionally, the UE may perform the determination in response to initiating the random access procedure on the target cell. Alternatively and/or additionally, the UE may perform the determination in response to the random access procedure on the target cell being successfully completed.

In some examples, in response to performing the determination, the UE may release or keep the dedicated PUR configuration in accordance with the determination.

In some examples, the UE may determine whether or not the target cell is the same as the source cell by comparing a physical cell identity (PCI) of the source cell and a PCI of the target cell (e.g., targetPhysCellId). For example, the UE may determine that the target cell is the same as the source cell based upon a determination that the PCI of the source cell matches the PCI of the target cell. Alternatively and/or additionally, the UE may determine that the target cell is different than the source cell based upon a determination that the PCI of the source cell does not match (and/or is different than) the PCI of the target cell.

In a fourth example embodiment of the present disclosure, a UE may determine whether to release a dedicated PUR configuration or to keep the dedicated PUR configuration based upon an indication (e.g., an explicit indication) in a RRCConnectionReconfiguration message comprising mobilityControlInfo. A handover procedure may be triggered by the RRCConnectionReconfiguration message comprising mobilityControlInfo. For example, the handover procedure may be performed to change a serving cell of the UE from a source cell to a target cell (e.g., the target cell may be indicated and/or identified in the mobilityControlInfo of the RRCConnectionReconfiguration message). In some examples, the UE may initiate the handover procedure in response to receiving the RRCConnectionReconfiguration message comprising mobilityControlInfo. The source cell may correspond to a serving cell of the UE where the dedicated PUR configuration is received and/or valid (e.g., the UE may receive the dedicated PUR configuration from the source cell).

In some examples, a network may determine and/or decide whether the UE should release the dedicated PUR configuration or keep the dedicated PUR configuration. The network may comprise an indication (e.g., an explicit indication of whether the UE should release or keep the dedicated PUR configuration) in the RRCConnectionReconfiguration message comprising mobilityControlInfo.

The UE may determine whether to release or keep the dedicated PUR configuration based upon the indication. For example, if the indication indicates that the UE should release the dedicated PUR configuration, the UE may release the dedicated PUR configuration (e.g., the UE may determine to release the dedicated PUR configuration based upon the indication indicating that the UE should release the dedicated PUR configuration). Alternatively and/or additionally, if the indication indicates that the UE should keep the dedicated PUR configuration, the UE may keep the dedicated PUR configuration (e.g., the UE may determine to keep the dedicated PUR configuration based upon the indication indicating that the UE should keep the dedicated PUR configuration).

In some examples, the UE may perform the determination (of whether to keep the dedicated PUR configuration or to release the dedicated PUR configuration) when the UE receives the RRCConnectionReconfiguration message comprising mobilityControlInfo (and/or the UE may perform the determination upon and/or in response to the UE receiving the RRCConnectionReconfiguration message comprising mobilityControlInfo). For example, the UE may perform the determination before or after acknowledging (such as to the network) the reception of the RRCConnectionReconfiguration message comprising mobilityControlInfo (e.g., the UE may acknowledge the reception by transmitting an indication of acknowledgment to the network). Alternatively and/or additionally, the UE may perform the determination before or after starting synchronizing to a downlink of the target cell. Alternatively and/or additionally, the UE may perform the determination before or after resetting MAC, such as associated with the source cell. Alternatively and/or additionally, the UE may perform the determination before or after applying a value of the newUE-Identity as the C-RNTI. Alternatively and/or additionally, the UE may perform the determination before or after performing a radio configuration procedure (e.g., a radio configuration procedure discussed in subclause 5.3.5.8 of 3GPP TS 36.331 V15.7.0). Alternatively and/or additionally, the UE may perform the determination (and/or may release the dedicated PUR configuration if the determination is to release the dedicated PUR configuration) during the radio configuration procedure. Alternatively and/or additionally, the UE may perform the determination before or after initiating a random access procedure on the target cell. Alternatively and/or additionally, the UE may perform the determination before or after the random access procedure on the target cell is successfully completed.

Alternatively and/or additionally, the UE may perform the determination in response to acknowledging (such as to the network) the reception of the RRCConnectionReconfiguration message comprising mobilityControlInfo. Alternatively and/or additionally, the UE may perform the determination in response to starting synchronizing to the downlink of the target cell. Alternatively and/or additionally, the UE may perform the determination in response to resetting MAC, such as associated with the source cell. Alternatively and/or additionally, the UE may perform the determination in response to applying the value of the newUE-Identity as the C-RNTI. Alternatively and/or additionally, the UE may perform the determination in response to performing the radio configuration procedure (e.g., a radio configuration procedure discussed in subclause 5.3.5.8 of 3GPP TS 36.331 V15.7.0). Alternatively and/or additionally, the UE may perform the determination in response to initiating the random access procedure on the target cell. Alternatively and/or additionally, the UE may perform the determination in response to the random access procedure on the target cell being successfully completed.

In some examples, in response to performing the determination, the UE may release or keep the dedicated PUR configuration in accordance with the determination.

In some examples, the indication (e.g., the explicit indication) is a single-bit indication (or the indication may have another amount of bits).

In some examples, if the indication is not present in the RRCConnectionReconfiguration message comprising mobilityControlInfo, the UE keeps the dedicated PUR configuration (e.g., the UE may determine to keep the dedicated PUR configuration based upon the RRCConnectionReconfiguration message not comprising the indication). Alternatively and/or additionally, if the explicit indication is not present in the RRCConnectionReconfiguration message comprising mobilityControlInfo, the UE may release the dedicated PUR configuration (e.g., the UE may determine to release the dedicated PUR configuration based upon the RRCConnectionReconfiguration message not comprising the indication).

In a fifth example embodiment of the present disclosure, a UE may determine whether to release a dedicated PUR configuration or to keep the dedicated PUR configuration based upon whether or not a RRCConnectionReconfiguration message, comprising mobilityControlInfo, comprises "fullConfig" (e.g., the "fullConfig" may correspond to a parameter and/or information element of the RRCConnectionReconfiguration message). A handover procedure may be triggered by the RRCConnectionReconfiguration message comprising mobilityControlInfo. For example, the handover procedure may be performed to change a serving cell of the UE from a source cell to a target cell (e.g., the target cell may be indicated and/or identified in the mobilityControlInfo of the RRCConnectionReconfiguration message). In some examples, the UE may initiate the handover procedure in response to receiving the RRCConnectionReconfiguration message comprising mobilityControlInfo. The source cell may correspond to a serving cell of the UE where the dedicated PUR configuration is received and/or valid (e.g., the UE may receive the dedicated PUR configuration from the source cell).

The target cell may determine whether or not to include the "fullConfig" in the RRCConnectionReconfiguration message. In some examples, if the target cell determines and/or knows that the UE has (and/or keeps) a dedicated PUR configuration, the target cell may include the "fullConfig" in the RRCConnectionReconfiguration message. Alternatively and/or additionally, if the target cell determines and/or knows that the UE does not have (and/or does not keep) a dedicated PUR configuration, the target cell may not include the "fullConfig" in the RRCConnectionReconfiguration message. In some examples, the target cell may determine whether or not the UE has (and/or keeps) a dedicated PUR configuration based upon an indication, such as from the source cell (e.g., if the UE has (and/or keeps) a dedicated PUR configuration, the source cell may indicate to the target cell that the UE has (and/or keeps) the dedicated PUR configuration).

The UE may determine whether to release or keep the dedicated PUR configuration based upon whether or not the RRCConnectionReconfiguration message, comprising mobilityControlInfo, comprises the "fullConfig". In some examples, if the RRCConnectionReconfiguration message, comprising mobilityControlInfo, comprises the "fullConfig", the UE may release the dedicated PUR configuration (e.g., the UE may determine to release the dedicated PUR configuration based upon the RRCConnectionReconfiguration message comprising the "fullConfig"). Alternatively and/or additionally, if the RRCConnectionReconfiguration message, comprising mobilityControlInfo, does not comprise the "fullConfig", the UE may keep the dedicated PUR configuration (e.g., the UE may determine to keep the dedicated PUR configuration based upon the RRCConnectionReconfiguration message not comprising the "fullConfig").

In some examples, the UE may perform the determination (of whether to keep the dedicated PUR configuration or to release the dedicated PUR configuration) when the UE receives the RRCConnectionReconfiguration message comprising mobilityControlInfo (and/or the UE may perform the determination upon and/or in response to the UE receiving the RRCConnectionReconfiguration message comprising mobilityControlInfo). For example, the UE may perform the determination before or after acknowledging (such as to a network) the reception of the RRCConnectionReconfiguration message comprising mobilityControlInfo (e.g., the UE may acknowledge the reception by transmitting an indication of acknowledgment to the network). Alternatively and/or additionally, the UE may perform the determination before or after starting synchronizing to a downlink of the target cell. Alternatively and/or additionally, the UE may perform the determination before or after resetting MAC, such as associated with the source cell. Alternatively and/or additionally, the UE may perform the determination before or after applying a value of the newUE-Identity as the C-RNTI. Alternatively and/or additionally, the UE may perform the determination before or after performing a radio configuration procedure (e.g., a radio configuration procedure discussed in subclause 5.3.5.8 of 3GPP TS 36.331 V15.7.0). Alternatively and/or additionally, the UE may perform the determination during the radio configuration procedure.

Alternatively and/or additionally, the UE may perform the determination in response to acknowledging (such as to the network) the reception of the RRCConnectionReconfiguration message comprising mobilityControlInfo. Alternatively and/or additionally, the UE may perform the determination in response to starting synchronizing to the downlink of the target cell. Alternatively and/or additionally, the UE may perform the determination in response to resetting MAC, such as associated with the source cell. Alternatively and/or additionally, the UE may perform the determination in response to applying the value of the newUE-Identity as the C-RNTI. Alternatively and/or additionally, the UE may perform the determination in response to performing the radio configuration procedure (e.g., a radio configuration procedure discussed in subclause 5.3.5.8 of 3GPP TS 36.331 V15.7.0).

In some examples, in response to performing the determination, the UE may release or keep the dedicated PUR configuration in accordance with the determination.

In some examples, techniques and/or operations provided herein with respect to the fifth example embodiment may be performed using a parameter and/or information element other than the "fullConfig". For example, the UE may determine whether to release or keep the dedicated PUR configuration based upon whether or not the RRCConnectionReconfiguration message, comprising mobilityControlInfo, comprises the parameter and/or the information element.

In some examples, if the RRCConnectionReconfiguration message, comprising mobilityControlInfo, comprises the parameter and/or the information element, the UE may release the dedicated PUR configuration (e.g., the UE may determine to release the dedicated PUR configuration based upon the RRCConnectionReconfiguration message comprising the parameter and/or the information element). Alternatively and/or additionally, if the RRCConnectionReconfiguration message, comprising mobilityControlInfo, does not comprise the parameter and/or the information element, the UE may keep the dedicated PUR configuration (e.g., the UE may determine to keep the dedicated PUR configuration based upon the RRCConnectionReconfiguration message not comprising the parameter and/or the information element).

Alternatively and/or additionally, if the RRCConnectionReconfiguration message, comprising mobilityControlInfo, comprises the parameter and/or the information element, the UE may keep the dedicated PUR configuration (e.g., the UE may determine to keep the dedicated PUR configuration based upon the RRCConnectionReconfiguration message comprising the parameter and/or the information element). Alternatively and/or additionally, if the RRCConnectionReconfiguration message, comprising mobilityControlInfo, does not comprise the parameter and/or the information element, the UE may release the dedicated PUR configuration (e.g., the UE may determine to release the dedicated PUR configuration based upon the RRCConnectionReconfiguration message not comprising the parameter and/or the information element).

In a sixth example embodiment of the present disclosure, a UE may release a dedicated PUR configuration if a handover procedure fails. In some examples, the handover procedure may be triggered by a RRCConnectionReconfiguration message comprising mobilityControlInfo. The handover procedure may be performed to change a serving cell of the UE from the source cell to the target cell (e.g., the target cell may be indicated and/or identified in the mobilityControlInfo of the RRCConnectionReconfiguration message). In some examples, the UE may initiate the handover procedure in response to receiving the RRCConnectionReconfiguration message comprising mobilityControlInfo. The source cell may correspond to a serving cell of the UE where the dedicated PUR configuration is received and/or valid (e.g., the UE may receive the dedicated PUR configuration from the source cell).

In some examples, the UE releases the dedicated PUR configuration when the handover procedure fails. For example, the UE may release the dedicated PUR configuration in response to expiration of a timer, such as expiration of timer T304 (e.g., timer T304 expiry may indicate handover failure).

In some examples, the UE keeps the dedicated PUR configuration when the timer T304 is started (e.g., the timer T304 may be started upon initiation of the handover procedure). The UE may keep the dedicated PUR configuration while the timer T304 is still running (e.g., the timer T304 may be running during the handover procedure).

In some examples, the UE may release the dedicated PUR configuration without initiating a random access procedure during the handover procedure (e.g., the UE may release the dedicated PUR configuration without initiating any random access procedure during the handover procedure). In an example, the UE may fail to synchronize to a downlink of the target cell and thus may not initiate a random access procedure during the handover procedure. In the example, the UE may release the dedicated PUR configuration in response to failure of the handover procedure.

In one, some and/or all of the foregoing techniques and/or embodiments, such as those described with respect to the first example embodiment, the second example embodiment, the third example embodiment, the fourth example embodiment, the fifth example embodiment and/or the sixth example embodiment, the UE may keep (i.e., may not release) the dedicated PUR configuration in response to reception of a RRCConnectionReconfiguration message that does not comprise mobilityControlInfo.

In one, some and/or all of the foregoing techniques and/or embodiments, such as those described with respect to the first example embodiment, the second example embodiment, the third example embodiment, the fourth example embodiment, the fifth example embodiment and/or the sixth example embodiment, the UE may transmit a dedicated PUR request (D-PUR request) to the network after the handover procedure is successfully completed. For example, the UE may transmit the D-PUR request to the network if the dedicated PUR configuration has been released by the UE.

In one, some and/or all of the foregoing techniques and/or embodiments, such as those described with respect to the first example embodiment, the second example embodiment, the third example embodiment, the fourth example embodiment, the fifth example embodiment and/or the sixth example embodiment, the handover (e.g., handover to change the serving cell from the source cell to the target cell) may be an intra-RAT handover (i.e., the Radio Access Technology (RAT) of the target cell and the RAT of the source cell are the same) or an inter-RAT handover (i.e., the RAT of the target cell and the RAT of the source cell are different).

In RRC_CONNECTED, the UE may initiate a RRC connection re-establishment procedure such as due to Radio Link Failure (RLF) or handover procedure failure (e.g., the UE may initiate the RRC connection re-establishment procedure in response to detecting RLF and/or handover procedure failure). During the RRC connection re-establishment procedure, the UE performs cell selection (e.g., a cell selection procedure may be performed to select a suitable cell). The UE may initiate a random access procedure on a cell selected via the cell selection (e.g., the cell selection procedure) during the RRC connection re-establishment procedure. The random access procedure is used to transmit a RRCConnectionReestablishmentRequest message to the selected cell. In such a scenario, whether the UE should keep a dedicated PUR configuration, such as a dedicated PUR configuration received in a source cell (e.g., a previous cell in which the RRC connection re-establishment procedure is initiated and/or triggered), needs to be specified. The UE should not keep the dedicated PUR configuration if the dedicated PUR configuration is not valid anymore. For example, if the UE uses an invalid PUR configuration to perform transmission, resource collision with a second UE may occur, resulting in transmission failure for one or both of the UE and the second UE. Alternatively and/or additionally, if the UE releases the dedicated PUR configuration, the UE is not able to perform transmission using resources configured in the dedicated PUR configuration.

Techniques are provided herein, which when implemented, solve the aforementioned issues, such as at least one of a UE not being able to determine whether to keep or release a dedicated PUR configuration, a UE not being able to determine whether or not a dedicated PUR configuration is valid, a UE using an invalid PUR configuration to perform transmission, resource collision with another UE as a result of the transmission, a UE not being able to perform transmission using resources configured in a dedicated PUR configuration if the UE releases the dedicated PUR configuration, etc.

In a seventh example embodiment of the present disclosure, a UE may release a dedicated PUR configuration in response to initiation of a RRC connection re-establishment procedure. In some examples, the RRC connection re-establishment procedure may be initiated (such as by the UE) in response to RLF or handover procedure failure. In some examples, the dedicated PUR configuration is received (such as before initiation of the RRC connection re-establishment procedure) in a source cell (e.g., a previous cell in which the RRC connection re-establishment procedure is initiated and/or triggered).

In some examples, the UE may release the dedicated PUR configuration when the UE initiates the RRC connection re-establishment procedure (and/or upon and/or in response to the UE initiating the RRC connection re-establishment procedure). For example, the UE may release the dedicated PUR configuration before or after resetting MAC, such as associated with the source cell. Alternatively and/or additionally, the UE may release the dedicated PUR configuration before or after starting performance of cell selection (e.g., a cell selection procedure may be performed, such as during the RRC connection re-establishment procedure, to select a suitable cell). Alternatively and/or additionally, the UE may release the dedicated PUR configuration before or after selecting a cell (e.g., a suitable cell selected via the cell selection procedure). Alternatively and/or additionally, the UE may release the dedicated PUR configuration before or after initiating a random access procedure on the selected cell.

Alternatively and/or additionally, the UE may release the dedicated PUR configuration in response to resetting MAC, such as associated with the source cell. Alternatively and/or additionally, the UE may release the dedicated PUR configuration in response to performing the cell selection. Alternatively and/or additionally, the UE may release the dedicated PUR configuration in response to selecting the cell (e.g., the suitable cell). Alternatively and/or additionally, the UE may release the dedicated PUR configuration in response to initiating the random access procedure on the selected cell. Alternatively and/or additionally, the UE may release the dedicated PUR configuration in response to successful completion of the random access procedure. Alternatively and/or additionally, the UE may release the dedicated PUR configuration in response to successful completion of the RRC connection re-establishment procedure. Alternatively and/or additionally, the UE may release the dedicated PUR configuration in response to reception of a RRCConnectionReestablishment message from the selected cell.

In some examples, the selected cell (e.g., the suitable cell selected via the cell selection procedure) may be the same as the source cell (e.g., the previous cell). For example, the UE may release the dedicated PUR configuration (such as in response to initiation of the RRC connection re-establishment procedure) even if the selected cell is the same as the source cell.

In some examples, the UE may release the dedicated PUR configuration regardless of whether or not the selected cell is the same as the source cell.

In some examples, the UE may release the dedicated PUR configuration without initiating a random access procedure during the RRC connection re-establishment procedure (e.g., the UE may release the dedicated PUR configuration without initiating any random access procedure during the RRC connection re-establishment procedure). For example, the UE may release the dedicated PUR configuration, and the UE may fail to find and/or select a suitable cell and thus may not initiate a random access procedure during the RRC connection re-establishment procedure.

In an eighth example embodiment of the present disclosure, a UE may keep a dedicated PUR configuration in response to initiation of a RRC connection re-establishment procedure. In some examples, the RRC connection re-establishment procedure may be initiated (such as by the UE) in response to RLF or handover procedure failure. In some examples, the dedicated PUR configuration is received (such as before initiation of the RRC connection re-establishment procedure) in a source cell (e.g., a previous cell in which the RRC connection re-establishment procedure is initiated and/or triggered).

The UE may not release the dedicated PUR configuration, such as due to the RRC connection re-establishment procedure.

In some examples, the UE may keep the dedicated PUR configuration during the RRC connection re-establishment procedure, such as while the RRC connection re-establishment procedure is still ongoing. For example, the UE may keep the dedicated PUR configuration in response to (and/or after) successful completion of a random access procedure (e.g., a random access procedure performed during the RRC connection re-establishment procedure), or the UE may release the dedicated PUR configuration in response to successful completion of the random access procedure. Alternatively and/or additionally, the UE may keep the dedicated PUR configuration in response to (and/or after) successful completion of the RRC connection re-establishment procedure.

In some examples, the selected cell (e.g., the suitable cell selected via the cell selection procedure) may be different than the source cell (e.g., the previous cell). For example, the UE may keep the dedicated PUR configuration (such as in response to initiation of the RRC connection re-establishment procedure) even if the selected cell is different than the source cell.

After the RRC connection re-establishment procedure successfully completes, a network may determine and/or decide whether or not the UE should release the dedicated PUR configuration.

In a ninth example embodiment of the present disclosure, a UE may determine whether to release a dedicated PUR configuration or to keep the dedicated PUR configuration based upon whether or not a selected cell is the same as a source cell. In some examples, a RRC connection re-establishment procedure may be initiated (such as by the UE) in response to RLF or handover procedure failure. In some examples, the dedicated PUR configuration is received (such as before initiation of the RRC connection re-establishment procedure) in a source cell (e.g., a previous cell in which the RRC connection re-establishment procedure is initiated and/or triggered). In some examples, a cell selection procedure may be performed, such as during the RRC connection re-establishment procedure, to select the selected cell (e.g., a suitable cell).

In some examples, if the selected cell is the same as the source cell, the UE may keep the dedicated PUR configuration (e.g., the UE may determine to keep the dedicated PUR configuration based upon the selected cell being the same as the source cell). Alternatively and/or additionally, if the selected cell is different than the source cell, the UE may release the dedicated PUR configuration (e.g., the UE may determine to release the dedicated PUR configuration based upon the selected cell being different than the source cell).

In some examples, the UE may perform the determination (of whether to keep the dedicated PUR configuration or to release the dedicated PUR configuration) when the UE selects the selected cell (e.g., the suitable cell) (and/or the UE may perform the determination upon and/or in response to the UE selecting the selected cell). Alternatively and/or additionally, the UE may perform the determination before initiating a random access procedure on the selected cell. Alternatively and/or additionally, the UE may perform the determination after initiating the random access procedure on the selected cell. Alternatively and/or additionally, the UE may perform the determination in response to initiating the random access procedure on the selected cell. Alternatively and/or additionally, the UE may perform the determination upon initiating the random access procedure on the selected cell.

In some examples, in response to performing the determination, the UE may release or keep the dedicated PUR configuration in accordance with the determination.

In some examples, the UE may determine whether or not the selected cell is the same as the source cell by comparing a PCI of the source cell and a PCI of the selected cell. For example, the UE may determine that the selected cell is the same as the source cell based upon a determination that the PCI of the source cell matches the PCI of the selected cell. Alternatively and/or additionally, the UE may determine that the selected cell is different than the source cell based upon a determination that the PCI of the source cell does not match (and/or is different than) the PCI of the selected cell.

In a tenth example embodiment of the present disclosure, a UE may release a dedicated PUR configuration if a RRC connection re-establishment procedure fails. In some examples, the RRC connection re-establishment procedure may be initiated (such as by the UE) in response to RLF or handover procedure failure. In some examples, the dedicated PUR configuration is received (such as before initiation of the RRC connection re-establishment procedure) in a source cell (e.g., a previous cell in which the RRC connection re-establishment procedure is initiated and/or triggered).

In some examples, the UE may release the dedicated PUR configuration when the RRC connection re-establishment procedure fails (and/or upon and/or in response to the RRC connection re-establishment procedure failing). For example, the UE may release the dedicated PUR configuration in response to (and/or when and/or upon) selecting a cell (such as a suitable cell selected during the RRC connection re-establishment procedure), where the selected cell does not connect to a Core Network type (e.g., Evolved Packet Core (EPC) or 5G Core (5GC)) to which the UE and/or the source cell was connected (such as where the selected cell connects to 5GC and the source cell connects to EPC, or such as where the selected cell connects to EPC and the source cell connects to 5GC). Alternatively and/or additionally, the UE may release the dedicated PUR configuration in response to (and/or when and/or upon) expiration of a timer, such as expiration of timer T311 during the RRC connection re-establishment procedure. Alternatively and/or additionally, the UE may release the dedicated PUR configuration in response to (and/or when and/or upon) expiration of timer T301 during the RRC connection re-establishment procedure. Alternatively and/or additionally, the UE may release the dedicated PUR configuration in response to (and/or when and/or upon) reception of a RRCConnectionReestablishmentReject message during the RRC connection re-establishment procedure.

In some examples, the UE keeps the dedicated PUR configuration when the timer T311 is started (e.g., the timer T311 may be started upon initiation of the RRC connection re-establishment procedure). The UE may keep the dedicated PUR configuration while the timer T311 is still running (e.g., the timer T311 may be running during the RRC connection re-establishment procedure). The UE may keep the dedicated PUR configuration while the timer T301 is still running during the RRC connection re-establishment procedure.

In some examples, the UE may release the dedicated PUR configuration without initiating a random access procedure during the RRC connection re-establishment procedure, such as where the RRC connection re-establishment procedure fails (e.g., the UE may release the dedicated PUR configuration without initiating any random access procedure during the RRC connection re-establishment procedure). In an example, the UE may select a cell (e.g., a suitable cell selected during the RRC connection re-establishment procedure) that connects to a Core Network type that is different than a Core Network type to which the source cell connects and thus the UE may not initiate a random access procedure during the RRC connection re-establishment procedure. In the example, the UE may release the dedicated PUR configuration in response to (and/or when and/or upon) selecting the cell. In another example, the UE may fail to find and/or select a suitable cell and thus may not initiate a random access procedure during the RRC connection re-establishment procedure, and the UE may release the dedicated PUR configuration in response to failure of the RRC connection re-establishment procedure.

In one, some and/or all of the foregoing techniques and/or embodiments, such as those described with respect to the seventh example embodiment, the eighth example embodiment, the ninth example embodiment, and/or the tenth example embodiment, the UE may transmit a dedicated PUR request (D-PUR request) to the network after the RRC connection re-establishment procedure is successfully completed. For example, the UE may transmit the D-PUR request to the network if the dedicated PUR configuration has been released by the UE.

In one, some and/or all of the foregoing techniques and/or embodiments, such as those described with respect to the first example embodiment, the second example embodiment, the third example embodiment, the fourth example embodiment, the fifth example embodiment, the sixth example embodiment, the seventh example embodiment, the eighth example embodiment, the ninth example embodiment, and/or the tenth example embodiment, the source cell may be a cell in which the UE receives the dedicated PUR configuration and/or a cell for which the dedicated PUR configuration is valid.

In one, some and/or all of the foregoing techniques and/or embodiments, such as those described with respect to the first example embodiment, the second example embodiment, the third example embodiment, the fourth example embodiment, the fifth example embodiment, the sixth example embodiment, the seventh example embodiment, the eighth example embodiment, the ninth example embodiment, and/or the tenth example embodiment, the UE may have already considered a TA for PUR (such as associated with the dedicated PUR configuration) to be invalid before initiation of the handover procedure and/or the RRC connection re-establishment procedure. For example, the UE may consider (e.g., continue to consider) the TA for PUR to be invalid in response to (and/or after and/or upon) initiation of the handover procedure and/or the RRC connection re-establishment procedure. Alternatively and/or additionally, the UE may consider (e.g., continue to consider) the TA for PUR to be invalid during the handover procedure and/or during the RRC connection re-establishment procedure. For example, initiation of the handover procedure and/or the RRC connection re-establishment procedure may not cause the TA for PUR to change from invalid to valid (and/or the TA for PUR may not change from invalid to valid in response to initiation of the handover procedure and/or the RRC connection re-establishment procedure).

One, some and/or all of the foregoing techniques and/or embodiments can be formed to a new embodiment.

In some examples, techniques and/or embodiments disclosed herein, such as techniques and/or embodiments described with respect to the first example embodiment, the second example embodiment, the third example embodiment, the fourth example embodiment, the fifth example embodiment, the sixth example embodiment, the seventh example embodiment, the eighth example embodiment, the ninth example embodiment, and the tenth example embodiment, may be implemented independently and/or separately.

Alternatively and/or additionally, a combination of techniques and/or embodiments described herein, such as techniques and/or embodiments described with respect to the first example embodiment, the second example embodiment, the third example embodiment, the fourth example embodiment, the fifth example embodiment, the sixth example embodiment, the seventh example embodiment, the eighth example embodiment, the ninth example embodiment, and/or the tenth example embodiment, may be implemented. In an example, the UE may keep the dedicated PUR configuration in response to reception of a RRCConnectionReconfiguration message comprising mobilityControlInfo, and the UE may release the dedicated PUR configuration in response to initiation of a RRC connection re-establishment procedure. Alternatively and/or additionally, the UE may keep the dedicated PUR configuration in response to reception of a RRCConnectionReconfiguration message comprising mobilityControlInfo, and the UE may release the dedicated PUR configuration if the handover procedure fails.

Alternatively and/or additionally, a combination of techniques and/or embodiments described herein, such as embodiments described with respect to the first example embodiment, the second example embodiment, the third example embodiment, the fourth example embodiment, the fifth example embodiment, the sixth example embodiment, the seventh example embodiment, the eighth example embodiment, the ninth example embodiment, and/or the tenth example embodiment, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 11:
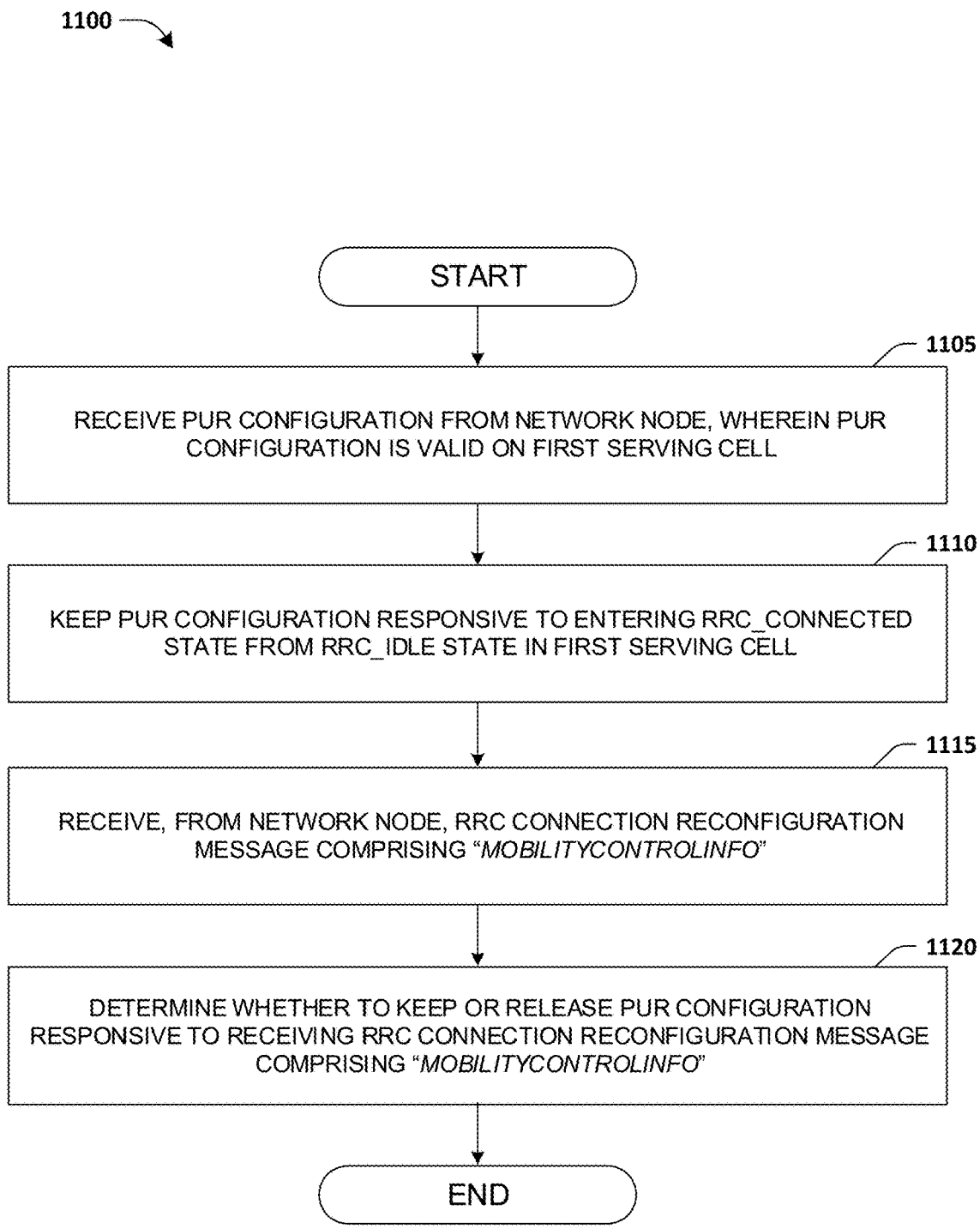
FIG. 11 is a flow chart according to one exemplary embodiment.

FIG. 11 is a flow chart 1100 according to one exemplary embodiment from the perspective of a UE. In step 1105, the UE receives a PUR configuration from a network node, wherein the PUR configuration is valid on a first serving cell. In step 1110, the UE keeps the PUR configuration in response to entering RRC_CONNECTED state from RRC_IDLE state in the first serving cell. In step 1115, the UE receives, from the network node, a RRC connection reconfiguration message comprising "mobilityControlInfo". In step 1120, the UE determines whether to keep or release the PUR configuration in response to receiving the RRC connection reconfiguration message comprising the "mobilityControlInfo".

In one embodiment, the UE determines to keep the PUR configuration if a target serving cell indicated in the "mobilityControlInfo" is the same as the first serving cell.

In one embodiment, the UE determines to release the PUR configuration if the target serving cell indicated in the "mobilityControlInfo" is different than the first serving cell.

In one embodiment, the UE determines whether the target serving cell is the same as the first serving cell or different than the first serving cell by comparing a PCI of the target serving cell with a PCI of the first serving cell.

In one embodiment, the UE determines to keep the PUR configuration if the RRC connection reconfiguration message is indicative of keeping the PUR configuration.

In one embodiment, the UE determines to release the PUR configuration if the RRC connection reconfiguration message is indicative of releasing the PUR configuration.

In one embodiment, the UE determines to keep the PUR configuration if an indication in the RRC connection reconfiguration message indicates keeping the PUR configuration.

In one embodiment, the UE determines to release the PUR configuration if the indication in the RRC connection reconfiguration message indicates releasing the PUR configuration.

In one embodiment, the UE determines to keep the PUR configuration if the RRC connection reconfiguration message does not comprise "fullConfig".

In one embodiment, the UE determines to release the PUR configuration if the RRC connection reconfiguration message comprises "fullConfig".

In one embodiment, the UE releases the PUR configuration in response to failure of a handover procedure, wherein the UE initiates the handover procedure in response to receiving the RRC connection reconfiguration message comprising the "mobilityControlInfo".

In one embodiment, the UE determines that the handover procedure fails in response to (and/or based upon) expiration of timer T304 (e.g., T304 expiry).

In one embodiment, the UE releases the PUR configuration in response to initiating a RRC connection re-establishment procedure in RRC_CONNECTED state.

In one embodiment, the UE keeps the PUR configuration in response to initiating a RRC connection re-establishment procedure in RRC_CONNECTED state, and the UE releases the PUR configuration in response to failure of the RRC connection re-establishment procedure.

In one embodiment, the UE determines that the RRC connection re-establishment procedure fails in response to expiration of timer T311 (e.g., T311 expiry) or expiration of timer T301 (e.g., T301 expiry).

In one embodiment, the UE keeps the PUR configuration if the RRC connection reconfiguration message does not comprise the "mobilityControlInfo".

In one embodiment, the UE does not use the PUR configuration to perform transmission in RRC_CONNECTED state.

In one embodiment, the UE uses the PUR configuration to perform transmission in RRC_IDLE state.

In one embodiment, the first serving cell is a Primary Cell (PCell) of the UE.

In one embodiment, if the UE keeps the PUR configuration, the UE is able to use the PUR configuration to perform transmission in RRC_IDLE state without having to receive another PUR configuration from the network node. For example, the UE may be able to use the PUR configuration to perform one or more later transmissions in RRC_DLE state without requiring another PUR configuration from the network node.

Referring back to FIGS. 3 and 4, in one exemplary embodiment of a UE, the device 300 includes a program code 312 stored in the memory 310. The CPU 308 could execute program code 312 to enable the UE (i) to receive a PUR configuration from a network node, wherein the PUR configuration is valid on a first serving cell, (ii) to keep the PUR configuration responsive to entering RRC_CONNECTED state from RRC_IDLE state in the first serving cell, (iii) to receive, from the network node, a RRC connection reconfiguration message comprising "mobilityControlInfo", and (iv) to determine whether to keep or release the PUR configuration responsive to receiving the RRC connection reconfiguration message comprising the "mobilityControlInfo". Furthermore, the CPU 308 can execute the program code 312 to perform one, some and/or all of the above-described actions and steps and/or others described herein.

Figure 12:
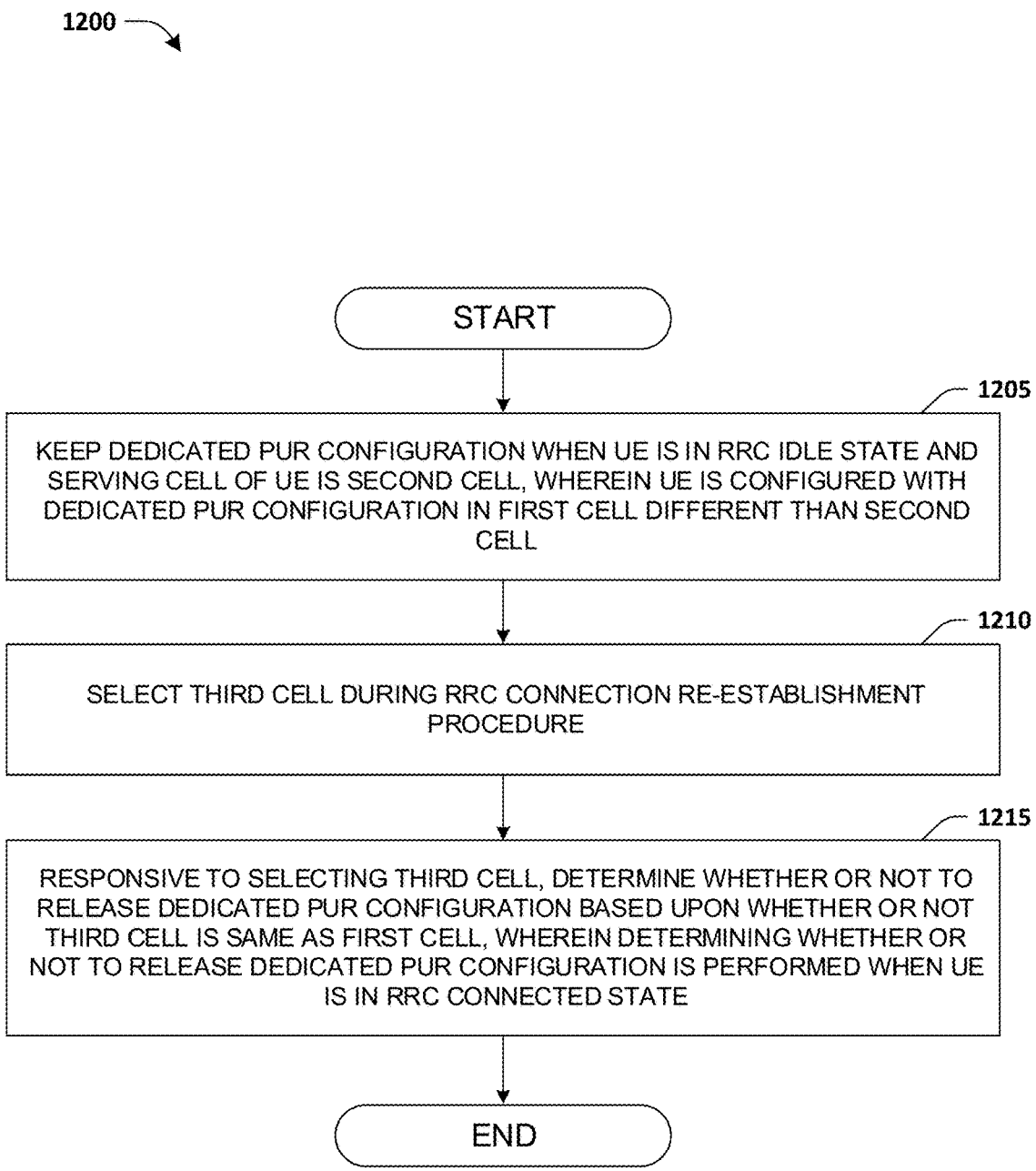
FIG. 12 is a flow chart according to one exemplary embodiment.

FIG. 12 is a flow chart 1200 according to one exemplary embodiment from the perspective of a UE. In step 1205, the UE keeps a dedicated PUR configuration when the UE is in RRC idle state (e.g., RRC_IDLE state) and a serving cell of the UE is a second cell, wherein the UE is configured with the dedicated PUR configuration in a first cell different than the second cell. For example, the UE may keep the dedicated PUR configuration when the UE is in RRC idle state and the serving cell of the UE changes (e.g., from the first cell) to the second cell that is different than the first cell. In step 1210, the UE selects a third cell during a RRC connection re-establishment procedure. In step 1215, in response to selecting the third cell, the UE determines whether or not to release the dedicated PUR configuration based upon whether or not the third cell is the same as the first cell, wherein the determination of whether or not to release the dedicated PUR configuration is performed when the UE is in RRC connected state (e.g., RRC_CONNECTED state). For example, the determination of whether or not to release the dedicated PUR configuration may be performed when the UE is in RRC connected state and the third cell is selected during the RRC connection re-establishment procedure.

In one embodiment, the UE receives, in the first cell, a RRCConnectionRelease message comprising the dedicated PUR configuration (e.g., the dedicated PUR configuration may be received and/or configured via the RRCConnectionRelease message).

In one embodiment, the UE releases the dedicated PUR configuration in response to and/or during performance of a random access procedure on the second cell. For example, the UE may release the dedicated PUR configuration when the UE performs the random access procedure on the second cell.

In one embodiment, the UE selects the third cell by performing a cell selection procedure, during the RRC connection re-establishment procedure, to select the third cell.

In one embodiment, the UE releases the dedicated PUR configuration if the third cell is different than the first cell, and/or the UE keeps the dedicated PUR configuration if the third cell is the same as the first cell.

In one embodiment, the UE determines to release the dedicated PUR configuration if the third cell is different than the first cell and the UE releases the dedicated PUR configuration in response to determining to release the dedicated PUR configuration. For example, the UE may determine to release the dedicated PUR configuration based upon the third cell being different than the first cell.

In one embodiment, the UE determines to keep the dedicated PUR configuration if the third cell is the same as the first cell and the UE keeps the dedicated PUR configuration in response to determining to keep the dedicated PUR configuration. For example, the UE may determine to keep the dedicated PUR configuration based upon the third cell being the same as the first cell.

In one embodiment, the UE initiates a random access procedure on the third cell during the RRC connection re-establishment procedure, wherein the determination of whether or not to release the dedicated PUR configuration is performed before initiating the random access procedure on the third cell.

In one embodiment, the UE determines whether or not to release the dedicated PUR configuration based upon whether or not the third cell connects to a first core network type to which the UE was connected before the third cell is selected. The UE determines to release the dedicated PUR configuration if the third cell is connected to a second core network type different than the first core network type. The UE releases the dedicated PUR configuration in response to determining to release the dedicated PUR configuration. In an example, the first core network type may correspond to a core network type to which the first cell connects.

In one embodiment, the UE determines whether or not to release the dedicated PUR configuration based upon whether or not the third cell connects to a first core network type to which the UE was connected before the third cell is selected. The UE determines to keep the dedicated PUR configuration if the third cell is connected to the first core network type. The UE keeps the dedicated PUR configuration in response to determining to keep the dedicated PUR configuration. In an example, the first core network type may correspond to a core network type to which the first cell connects.

In one embodiment, the UE does not initiate a random access procedure during the RRC connection re-establishment procedure.

In one embodiment, the UE keeps the dedicated PUR configuration in response to receiving a RRCConnectionReconfiguration message comprising a mobilityControlInfo information element, wherein a fourth cell indicated by the mobilityControlInfo information element is different than the first cell.

In one embodiment, the dedicated PUR configuration is indicative of one or more PUR for performance of transmission in the first cell by the UE when the UE is in RRC idle state (e.g., the one or more PUR may be for the UE to perform one or more transmissions in the first cell when the UE is in RRC_IDLE state).

Referring back to FIGS. 3 and 4, in one exemplary embodiment of a UE, the device 300 includes a program code 312 stored in the memory 310. The CPU 308 could execute program code 312 to enable the UE (i) to keep a dedicated PUR configuration when the UE is in RRC idle state and a serving cell of the UE is a second cell, wherein the UE is configured with the dedicated PUR configuration in a first cell different than the second cell, (ii) to select a third cell during a RRC connection re-establishment procedure, and (iii) responsive to selecting the third cell, to determine whether or not to release the dedicated PUR configuration based upon whether or not the third cell is the same as the first cell, wherein the determining whether or not to release the dedicated PUR configuration is performed when the UE is in RRC connected state. Furthermore, the CPU 308 can execute the program code 312 to perform one, some and/or all of the above-described actions and steps and/or others described herein.

Figure 13:
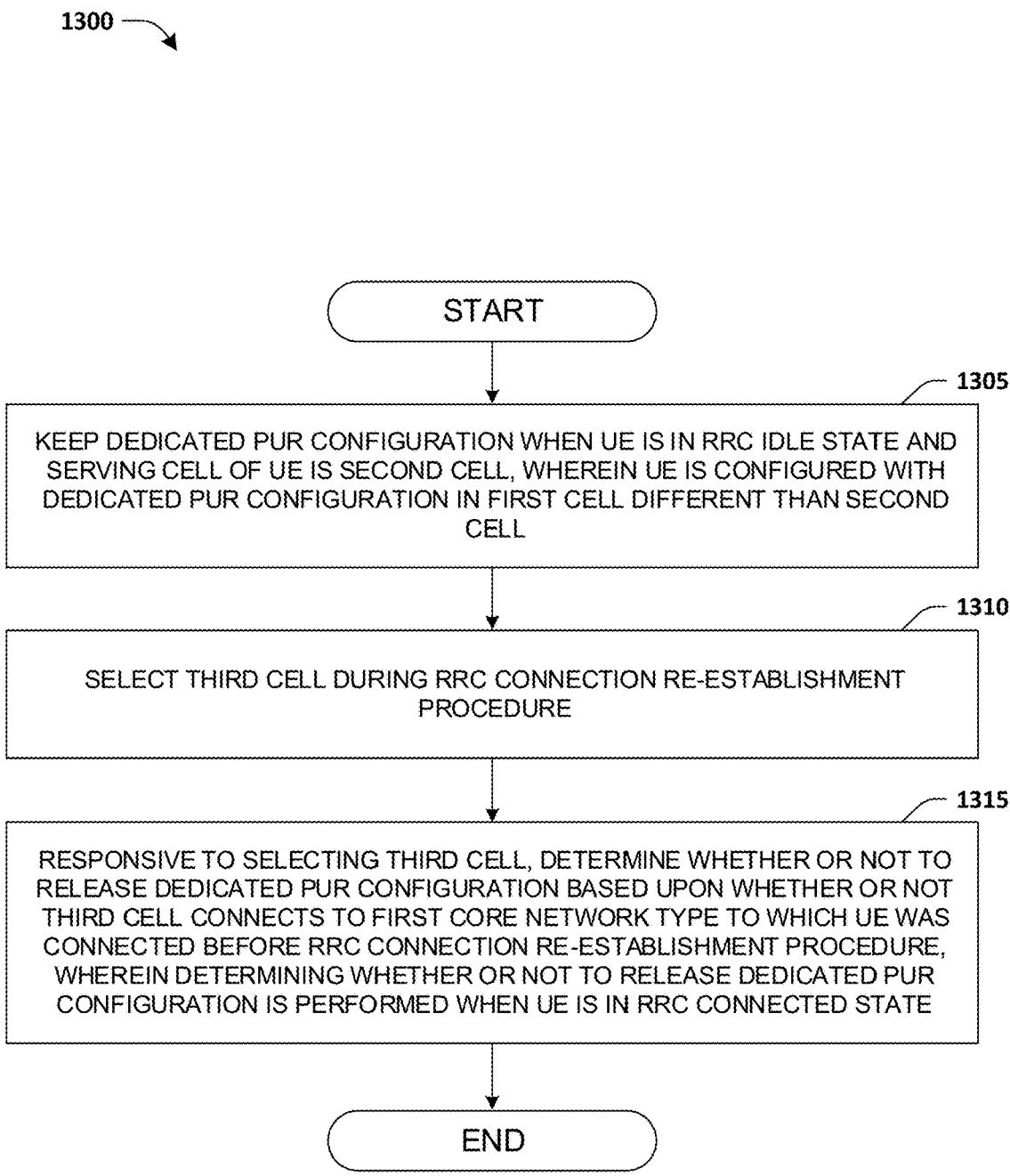
FIG. 13 is a flow chart according to one exemplary embodiment.

FIG. 13 is a flow chart 1300 according to one exemplary embodiment from the perspective of a UE. In step 1305, the UE keeps a dedicated PUR configuration when the UE is in RRC idle state (e.g., RRC_IDLE state) and a serving cell of the UE is a second cell, wherein the UE is configured with the dedicated PUR configuration in a first cell different than the second cell. For example, the UE may keep the dedicated PUR configuration when the UE is in RRC idle state and the serving cell of the UE changes (e.g., from the first cell) to the second cell that is different than the second cell. In step 1310, the UE selects a third cell during a RRC connection re-establishment procedure. In step 1315, in response to selecting the third cell, the UE determines whether or not to release the dedicated PUR configuration based upon whether or not the third cell connects to a first core network type to which the UE was connected before the third cell is selected, wherein the determination of whether or not to release the dedicated PUR configuration is performed when the UE is in RRC connected state. For example, the determination of whether or not to release the dedicated PUR configuration may be performed when the UE is in RRC connected state and the third cell is selected during the RRC connection re-establishment procedure.

In one embodiment, the UE determines to release the dedicated PUR configuration if the third cell is connected to a second core network type different than the first core network type. The UE releases the dedicated PUR configuration in response to determining to release the dedicated PUR configuration.

In one embodiment, the UE determines to keep the dedicated PUR configuration if the third cell is connected to the first core network type. The UE keeps the dedicated PUR configuration in response to determining to keep the dedicated PUR configuration.

Referring back to FIGS. 3 and 4, in one exemplary embodiment of a UE, the device 300 includes a program code 312 stored in the memory 310. The CPU 308 could execute program code 312 to enable the UE (i) to keep a dedicated PUR configuration when the UE is in RRC idle state and a serving cell of the UE is a second cell, wherein the UE is configured with the dedicated PUR configuration in a first cell different than the second cell, (ii) to select a third cell during a RRC connection re-establishment procedure, and (iii) responsive to the selecting the third cell, to determine whether or not to release the dedicated PUR configuration based upon whether or not the third cell connects to a first core network type to which the UE was connected before the selecting the third cell, wherein the determining whether or not to release the dedicated PUR configuration is performed when the UE is in RRC connected state. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform one, some and/or all method steps illustrated in FIGS. 11-13. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 11-13, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). The increased efficiency may be a result of enabling a device (e.g., a UE) to determine whether to keep or release a PUR configuration. Alternatively and/or additionally, the increased efficiency may be a result of enabling the device to release an invalid PUR configuration, thus avoiding resource collision with another device that may otherwise occur if the device uses an invalid PUR configuration for transmission. Alternatively and/or additionally, the increased efficiency may be a result of enabling the device to keep a valid PUR configuration, thus enabling the device to use the valid PUR configuration later when the device is in RRC_IDLE state. For example, the device may perform transmission to a network node using the valid PUR configuration without requiring another PUR configuration from the network node.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
keeping a dedicated Preconfigured Uplink Resources (PUR) configuration when the UE is in Radio Resource Control (RRC) idle state and a serving cell of the UE is a second cell, wherein the UE is configured with the dedicated PUR configuration in a first cell different than the second cell;
selecting a third cell during a RRC connection re-establishment procedure; and
responsive to the selecting the third cell, determining whether or not to release the dedicated PUR configuration based upon whether or not the third cell is the same as the first cell, wherein the determining whether or not to release the dedicated PUR configuration is performed when the UE is in RRC connected state, wherein:
the determining whether or not to release the dedicated PUR configuration comprises determining to release the dedicated PUR configuration when the third cell is different than the first cell, wherein the method comprises releasing the dedicated PUR configuration responsive to the determining to release the dedicated PUR configuration; or
the determining whether or not to release the dedicated PUR configuration comprises determining to keep the dedicated PUR configuration when the third cell is the same as the first cell, wherein the method comprises keeping the dedicated PUR configuration responsive to the determining to keep the dedicated PUR configuration.

2. The method of claim 1, comprising:
receiving, in the first cell, a RRCConnectionRelease message comprising the dedicated PUR configuration.

3. The method of claim 1, comprising:
releasing the dedicated PUR configuration at least one of responsive to or during performance of a random access procedure on the second cell.

4. The method of claim 1, wherein:
the selecting the third cell comprises performing a cell selection procedure, during the RRC connection re-establishment procedure, to select the third cell.

5. The method of claim 1, comprising:
initiating a random access procedure on the third cell during the RRC connection re-establishment procedure.

6. The method of claim 5, wherein:
the determining whether or not to release the dedicated PUR configuration is performed before the initiating the random access procedure on the third cell.

7. The method of claim 1, wherein:
the determining whether or not to release the dedicated PUR configuration is based upon whether or not the third cell connects to a first core network type to which the UE was connected before the selecting the third cell;
the determining whether or not to release the dedicated PUR configuration comprises determining to release the dedicated PUR configuration when the third cell is connected to a second core network type different than the first core network type; and
the method comprises releasing the dedicated PUR configuration responsive to the determining to release the dedicated PUR configuration.

8. The method of claim 7, wherein:
a random access procedure is not initiated by the UE during the RRC connection re-establishment procedure.

9. The method of claim 1, comprising:
keeping the dedicated PUR configuration responsive to receiving a RRCConnectionReconfiguration message comprising a mobilityControlInfo information element, wherein a fourth cell indicated by the mobilityControlInfo information element is different than the first cell.

10. The method of claim 1, wherein:
the dedicated PUR configuration is indicative of one or more PUR for performance of transmission in the first cell by the UE when the UE is in RRC idle state.

11. A User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
- keeping a dedicated Preconfigured Uplink Resources (PUR) configuration when the UE is in Radio Resource Control (RRC) idle state and a serving cell of the UE is a second cell, wherein the UE is configured with the dedicated PUR configuration in a first cell different than the second cell;
- selecting a third cell during a RRC connection re-establishment procedure; and
- responsive to the selecting the third cell, determining whether or not to release the dedicated PUR configuration based upon whether or not the third cell is the same as the first cell, wherein the determining whether or not to release the dedicated PUR configuration is performed when the UE is in RRC connected state, wherein:
  - the determining whether or not to release the dedicated PUR configuration comprises determining to release the dedicated PUR configuration when the third cell is different than the first cell, wherein the operations comprise releasing the dedicated PUR configuration responsive to the determining to release the dedicated PUR configuration; or
  - the determining whether or not to release the dedicated PUR configuration comprises determining to keep the dedicated PUR configuration when the third cell is the same as the first cell, wherein the operations comprise keeping the dedicated PUR configuration responsive to the determining to keep the dedicated PUR configuration.

12. The UE of claim 11, the operations comprising:
receiving, in the first cell, a RRCConnectionRelease message comprising the dedicated PUR configuration, wherein the dedicated PUR configuration is indicative of one or more PUR for performance of transmission in the first cell by the UE when the UE is in RRC idle state.

13. The UE of claim 11, the operations comprising:
releasing the dedicated PUR configuration at least one of responsive to or during performance of a random access procedure on the second cell.

14. The UE of claim 11, wherein:
the selecting the third cell comprises performing a cell selection procedure, during the RRC connection re-establishment procedure, to select the third cell.

15. The UE of claim 11, the operations comprising:
initiating a random access procedure on the third cell during the RRC connection re-establishment procedure.

16. The UE of claim 15, wherein:
the determining whether or not to release the dedicated PUR configuration is performed before the initiating the random access procedure on the third cell.

17. The UE of claim 11, wherein:
the determining whether or not to release the dedicated PUR configuration is based upon whether or not the third cell connects to a first core network type to which the UE was connected before the selecting the third cell;
the determining whether or not to release the dedicated PUR configuration comprises determining to release the dedicated PUR configuration when the third cell is connected to a second core network type different than the first core network type; and
the operations comprise releasing the dedicated PUR configuration responsive to the determining to release the dedicated PUR configuration.

18. The UE of claim 17, wherein:
a random access procedure is not initiated by the UE during the RRC connection re-establishment procedure.

19. The UE of claim 11, the operations comprising:
keeping the dedicated PUR configuration responsive to receiving a RRCConnectionReconfiguration message comprising a mobilityControlInfo information element, wherein a fourth cell indicated by the mobilityControlInfo information element is different than the first cell.

20. A non-transitory computer-readable medium comprising processor-executable instructions that when executed by a User Equipment (UE) cause performance of operations, the operations comprising:
- keeping a dedicated Preconfigured Uplink Resources (PUR) configuration when the UE is in Radio Resource Control (RRC) idle state and a serving cell of the UE is a second cell, wherein the UE is configured with the dedicated PUR configuration in a first cell different than the second cell;
- selecting a third cell during a RRC connection re-establishment procedure; and
- responsive to the selecting the third cell, determining whether or not to release the dedicated PUR configuration based upon whether or not the third cell connects to a first core network type to which the UE was connected before the selecting the third cell, wherein the determining whether or not to release the dedicated PUR configuration is performed when the UE is in RRC connected state, wherein:
  - the determining whether or not to release the dedicated PUR configuration comprises determining to release the dedicated PUR configuration when the third cell is connected to a second core network type different than the first core network type, wherein the operations comprise releasing the dedicated PUR configuration responsive to the determining to release the dedicated PUR configuration; or
  - the determining whether or not to release the dedicated PUR configuration comprises determining to keep the dedicated PUR configuration when the third cell is connected to the first core network type, wherein the operations comprise keeping the dedicated PUR configuration responsive to the determining to keep the dedicated PUR configuration.

* * * * *